US007563161B2

(12) United States Patent
Perret

(10) Patent No.: US 7,563,161 B2
(45) Date of Patent: Jul. 21, 2009

(54) CONTROL DEVICE FOR ACTUATING AT LEAST TWO ITEMS OF SWITCHGEAR IN CO-ORDINATED MANNER, ONE OF WHICH ITEMS PERFORMS INTERRUPTION IN A VACUUM

(75) Inventor: Michel Perret, Tramolé (FR)

(73) Assignee: Areva T & D SA, Paris la Defense Cedex (FR)

( * ) Notice: Subject to any disclaimer, the term of this patent is extended or adjusted under 35 U.S.C. 154(b) by 1043 days.

(21) Appl. No.: 11/090,664

(22) Filed: Mar. 25, 2005

(65) Prior Publication Data

US 2005/0247677 A1 Nov. 10, 2005

(30) Foreign Application Priority Data

Mar. 25, 2004 (FR) .................................. 04 50589

(51) Int. Cl.
*G06F 17/00* (2006.01)
*H01H 33/66* (2006.01)

(52) U.S. Cl. ........................................ 463/13; 218/140

(58) Field of Classification Search .................. 463/13; 218/3, 30, 61, 68, 140
See application file for complete search history.

(56) References Cited

U.S. PATENT DOCUMENTS

| | | | | |
|---|---|---|---|---|
| 4,458,119 | A | 7/1984 | Hashimoto et al. | |
| 4,550,234 | A * | 10/1985 | Steinemer | 218/140 |
| 4,906,935 | A * | 3/1990 | Hess et al. | 324/409 |
| 5,079,392 | A * | 1/1992 | Tsukushi et al. | 218/59 |
| 5,286,933 | A * | 2/1994 | Pham | 218/119 |
| 5,739,419 | A * | 4/1998 | Maier et al. | 73/37 |
| 5,905,242 | A | 5/1999 | Bernard et al. | |
| 6,849,819 | B2 * | 2/2005 | Tresy et al. | 218/3 |
| 7,199,324 | B2 * | 4/2007 | Perret | 218/3 |
| 7,426,100 | B2 * | 9/2008 | Neveu et al. | 361/115 |
| 2003/0089682 | A1 | 5/2003 | Skarby et al. | |

FOREIGN PATENT DOCUMENTS

| | | |
|---|---|---|
| EP | 1 310 970 A1 | 5/2003 |
| WO | 97/08723 | 3/1997 |

* cited by examiner

*Primary Examiner*—Ronald Laneau
(74) *Attorney, Agent, or Firm*—Nixon Peabody LLP

(57) ABSTRACT

The control device comprises a vacuum first item of switchgear (1) which includes a pair of contacts (5, 6) that can be separated for interruption purposes. It also includes a main drive shaft (2) for actuating a second item of switchgear (10) immersed in a gaseous insulating fluid ($G_2$) contained at a determined pressure ($P_2$), and further includes an auxiliary shaft (4) to enable a moving contact (5) of the first item of switchgear (1) to be driven. The auxiliary shaft (4) passes in leaktight manner through a wall (7A, 7') which separates the volume of gaseous insulating fluid ($G_2$) from another volume ($V_1$) of fluid ($G_1$) at a lower pressure, the difference between the respective pressures ($P_2$, $P_1$) of the two fluids ($G_2$, $G_1$) procuring a certain force ($F_p$) which is applied to said auxiliary shaft (4) and which participates in said contact pressure force.

16 Claims, 11 Drawing Sheets

CONTROL DEVICE FOR ACTUATING AT LEAST TWO ITEMS OF SWITCHGEAR IN CO-ORDINATED MANNER, ONE OF WHICH ITEMS PERFORMS INTERRUPTION IN A VACUUM

CROSS-REFERENCE TO RELATED APPLICATION

This application claims priority to French Application No. 04 50589, filed on Mar. 25, 2004, entitled: "A Control Device for Actuating at Least Two Item of Switchgear in Co-Ordinated Manner, One of Which Items Performs Interruption in a Vacuum" by Michel Perret and was not published in English.

The invention relates to a control device for actuating at least two items of switchgear in co-ordinated manner, which items are electrically connected together in series to constitute a switchgear assembly in which a vacuum first item of switchgear that performs interruption in a vacuum includes a pair of contacts that can be separated to switch from a closed position to an open position. The control device includes a main drive shaft for actuating a second item of switchgear immersed in a gaseous insulating fluid contained in a certain volume at a determined pressure, and the control device further includes an auxiliary shaft suitable for being moved by coupling means to enable a moving contact of the first item of switchgear to be driven when said main shaft is moved, said moving contact being held pressed against the other contact of said first item of switchgear, when said first item of switchgear is in the closed position, by a force chosen to generate a contact pressure higher than a determined value. It is well known that a certain contact pressure is generally necessary when a vacuum interrupter is in the closed state in order to prevent the contacts from separating under the effect of the electrodynamic repulsion forces in particular if a short-circuit current is passing through the interrupter.

A device of that type is known in particular from Patent Document WO 9708723. That control device for actuating a high-voltage hybrid circuit-breaker includes a main drive shaft for actuating a gas interrupter containing a dielectric insulating gas such as sulfur hexafluoride $SF_6$. That hybrid circuit-breaker is air-insulated because the interrupting chamber of the gas interrupter is contained in an insulating sheath which has fins on its outside surface. The main drive shaft is contained in a compartment defined by a casing, which communicates with another compartment defined by the insulating sheath of the gas interrupter in order to enable the main shaft to be connected to the moving contact of the interrupter. That casing is dimensioned to contain a vacuum interrupter whose fixed contact is connected to one of its walls. The casing thus constitutes one pole of the high-voltage hybrid circuit-breaker.

A connection terminal of that pole of the hybrid circuit-breaker is fixed to the casing by being interposed between the two compartments, so that the permanent current in the circuit-breaker does not pass via the vacuum interrupter whose function is to withstand the re-establishment transient voltage when the current is interrupted. The moving contact of the vacuum interrupter is electrically connected to the moving contact of the gas interrupter via a connection braid, and is actuated by an auxiliary shaft that is provided with spring means for generating contact pressure that is sufficient when the vacuum interrupter is in the closed state. That auxiliary shaft is perpendicular to the main shaft and is coupled thereto via a lever shaped like a bell crank and that pivots about an axis that is fixed relative to the casing, thereby enabling movement to be deflected by substantially 90°.

The vacuum interrupter is subjected to the pressure of the dielectric insulating gas which fills the two compartments. Since a pressure that is substantially zero prevails in the leaktight chamber of the vacuum interrupter, also referred to as a vacuum chamber, that chamber must be organized to withstand the pressure forces from the outside gas that can be particularly large, in particular on the insulating cylindrical wall and on the metal bellows of the vacuum chamber. If the pressure of the insulating gas needs to be relatively high (generally greater than five bars when a gas mixture is used in which the proportion of nitrogen is greater than 80% as is known from the state of the art, or else when pure nitrogen is used), it is possible to use a vacuum chamber in which the structure of the leaktight chamber is designed to withstand said pressure, but that type of interrupter is still uncommon and is particularly costly. It is also possible to provide protective reinforcement around the vacuum interrupter, as known from Japanese Patent Document JP 2003 045300 which describes overmolding resin around a vacuum chamber designed to be immersed in pure nitrogen at a pressure of several bars. That solution is also costly to implement, and it remains difficult to prevent too high a pressure of insulating gas from being applied in particular to the metal bellows of the chamber with the risk of the bellows being deformed or broken.

European Patent Application EP 1 310 970 also discloses another device of that type which uses different coupling means for enabling the moving contact of the vacuum interrupter to be driven by an auxiliary shaft coupled to the main shaft. In addition, the two items of switchgear (not shown in that patent document) are electrically connected together in series in particular via a casing that encloses the coupling means and that communicates with the interrupting chamber of the gas interrupter. As a result, the permanent current in the hybrid circuit-breaker passes via the vacuum interrupter. The auxiliary shaft is provided with resilient means such as, for example, an arrangement of spring disks or of Belleville spring washers, for generating contact pressure that is sufficient when the vacuum interrupter is in the closed state. Those resilient means are received inside an abutment member that is substantially socket-shaped and whose end-wall is provided with a through hole so that the auxiliary shaft can be pass through it. That abutment member is firmly inserted into a flange which is connected to the casing and which participates in electrically connecting the two items of switchgear together in series. When the vacuum interrupter is opened, the resilient means deform while being held between the end-wall of the socket and a collar secured to a rod of the auxiliary shaft. The empty distance between the collar and a shoulder of the socket determines the remaining stroke for the moving contact of the vacuum interrupter until the interrupter is opened fully.

The vacuum interrupter is situated in a compartment adjacent to the compartment defined by the casing. The two adjacent compartments communicate with each other via the space inside the abutment member, even if the passageway for the insulating gas through the above-mentioned spring arrangement is relatively narrow. As a result, if the pressure of the insulating gas in the interrupting chamber of the gas interrupter needs to be relatively high, the compartment of the vacuum interrupter is inevitably subjected to a pressure that is identical or almost as high. The problem of resistance to pressure for the leaktight chamber of the vacuum interrupter can thus also arise with such a hybrid circuit-breaker device.

In addition, resilient means such as washers for generating the contact pressure in the vacuum interrupter do not make it possible to obtain a long stroke for the moving contact of the interrupter. Typically, resilient washers allow a maximum stroke of about one centimeter. Unfortunately, high-voltage hybrid circuit-breakers will have to be rated for ranges of voltage that are increasingly high, which will make it necessary to adopt vacuum interrupters with contact spacing that is increasingly large, and typically greater than two centimeters. In which case, it would seem to be difficult to continue to use spring disks or washers in the control device of a vacuum interrupter, because the maximum spacing between the contacts of the interrupter would then be limited by the characteristics of the contact pressure resilient means independently of the intrinsic characteristics of the interrupter. On this subject, it can be recalled that the maximum stroke intrinsically allowed for the moving contact of a vacuum interrupter generally depends on the elasticity limits of the sealing metal bellows of the interrupter.

The use of conventional helical springs can make it possible to obtain the desired stroke for the moving contact of the vacuum interrupter. But due to the fact that the contact pressure is conventionally provided entirely by a mechanical spring, the dimensions and the moving mass of the contact pressure spring device will inevitably increase with the increasing maximum short-circuit current for which the interrupter is rated.

An object of the invention is to remedy those drawbacks. A first object of the invention is to make it possible to increase the insulating gas pressure in a gas item of switchgear of a switchgear assembly, and in particular a hybrid interrupting switchgear assembly, without this making it necessary to increase the protection of the vacuum interrupter against the pressure of the gas that surrounds its leaktight chamber in particular at the sealing metal bellows. A second object of the invention is to propose a control device for a switchgear assembly including a vacuum interrupter that makes it possible optionally to omit a mechanical resilient arrangement for generating the contact pressure in the interrupter or which makes it possible at least for such a resilient arrangement not to have to generate by itself most of the contact pressure necessary to enable the interrupter to pass a short-circuit current. Finally, an additional object is to make it possible for the moving contact of the vacuum interrupter to be driven over the entire stroke intrinsically allowed for the interrupter.

To this end, the invention provides a control device as defined above, characterized in that the auxiliary shaft passes in leaktight manner through a wall which separates the volume of gaseous insulating fluid from another volume of fluid at a lower pressure, the difference between the respective pressures of the two fluids procuring a certain force which is applied to the auxiliary shaft and which participates in the contact pressure force.

In a first advantageous embodiment, a portion of the auxiliary shaft is constituted by a piston suitable for being moved inside a bore formed by a part which is mounted in leaktight manner in an opening in the wall, sealing means for sealing relative to the gaseous insulating fluid being arranged between the piston and the bore. Preferably, the wall and the bore constitute an electrically conductive assembly connected to a pole of the second item of switchgear, the piston includes at least one electrically conductive portion connected to the moving contact of the first item of switchgear, and sliding contacts are disposed between the bore and the conductive portion of the piston. The wall may be constituted by one face of a casing which encloses at least a portion of the volume of gaseous insulating fluid and in which the coupling means are disposed.

If the switchgear assembly is designed to be used as air-insulated switchgear, the casing is preferably open on one side which is assembled in leaktight manner to one end of an insulating sheath that provides air insulation between the two poles of the second item of switchgear. The casing is then disposed directly in air, and provides sealing between the insulating gas of the second item of switchgear and the outside air.

If the switchgear assembly is designed to be used as metal-clad type switchgear, the casing then serves to provide mechanical support rather than sealing because the metal cladding of the switchgear is necessarily leaktight between the volume of gaseous insulating fluid and the outside air.

In a second embodiment, the wall is bonded to a conductive plate electrically connected to a pole of the second item of switchgear and has a flexible zone in the center of which an opening is provided through which said auxiliary shaft passes in leaktight manner. The flexible zone of the wall then constitutes a sealing bellows which performs a mechanical function of generating a differential pressure force. Preferably, the auxiliary shaft is provided with a guide piston suitable for being moved with electrical contact inside a bore electrically connected to the conductive plate.

In both of the above-mentioned embodiments, the coupling means may comprise resilient compression mechanical means suitable for exerting a force on the auxiliary shaft for participating in said contact pressure force in addition to the force procured by the difference in the respective pressures of the two insulating fluids.

The invention, its characteristics and its advantages appear more clearly from the following description given with reference to the accompanying drawings which show certain embodiments of the invention by way of non-limiting example, and in which.

Figure 3:
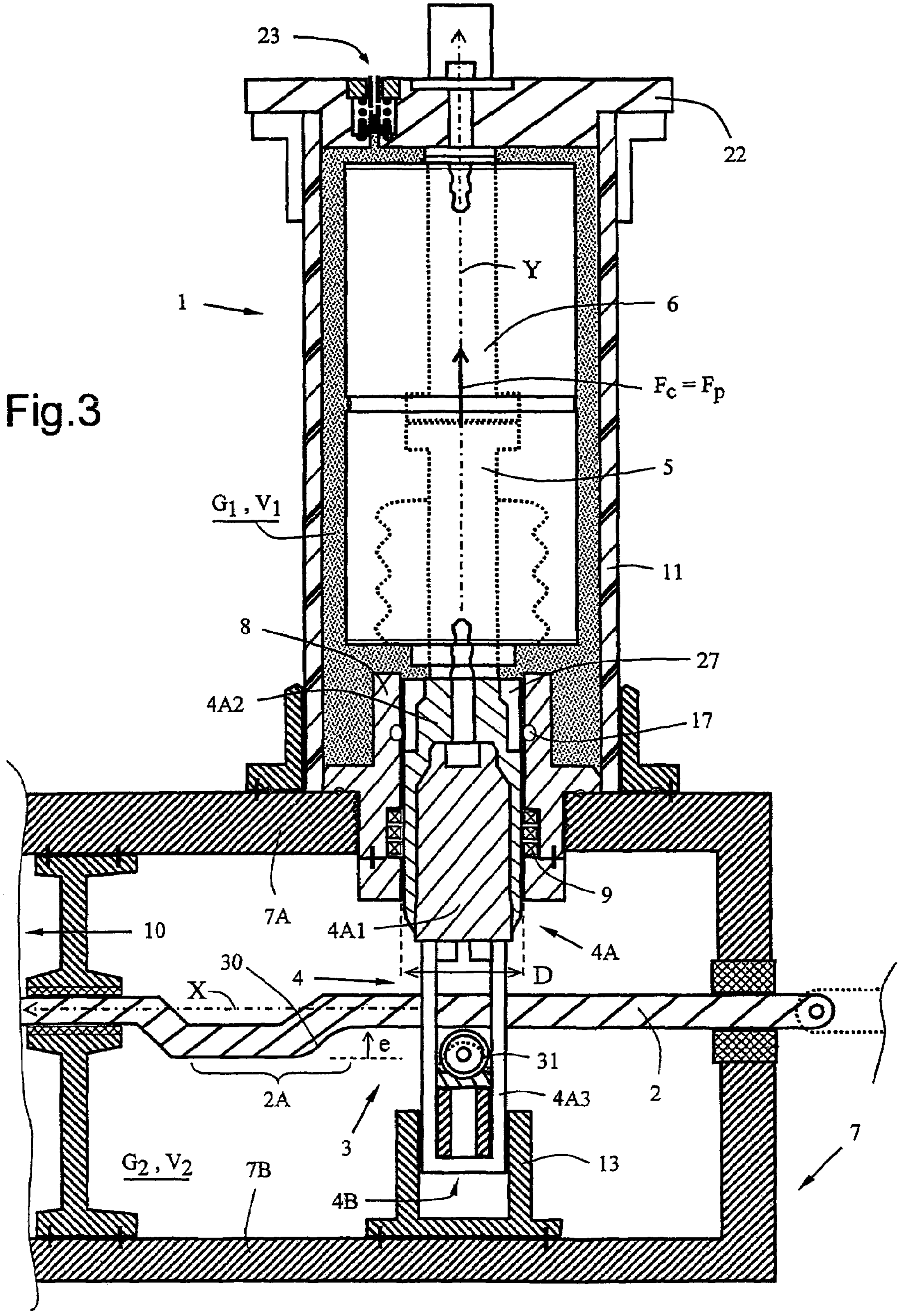
FIG. 3 is a diagrammatic view of a control device of the invention, as applied to a hybrid interrupting switchgear assembly in which the vacuum switchgear is disposed substantially perpendicularly to the main axis of the gas switchgear.
Figures 7, 7A, 7B:
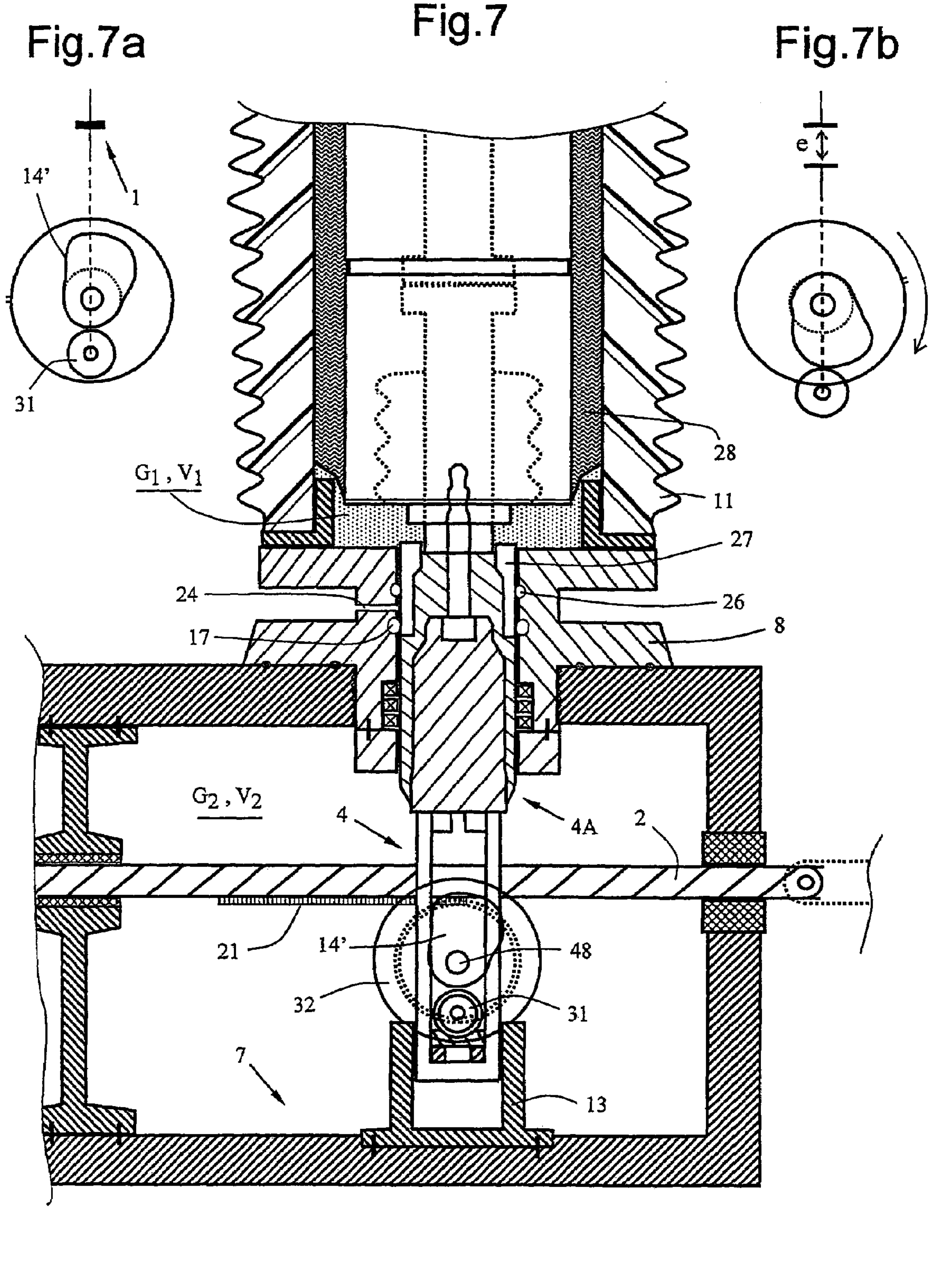
Figure 8:
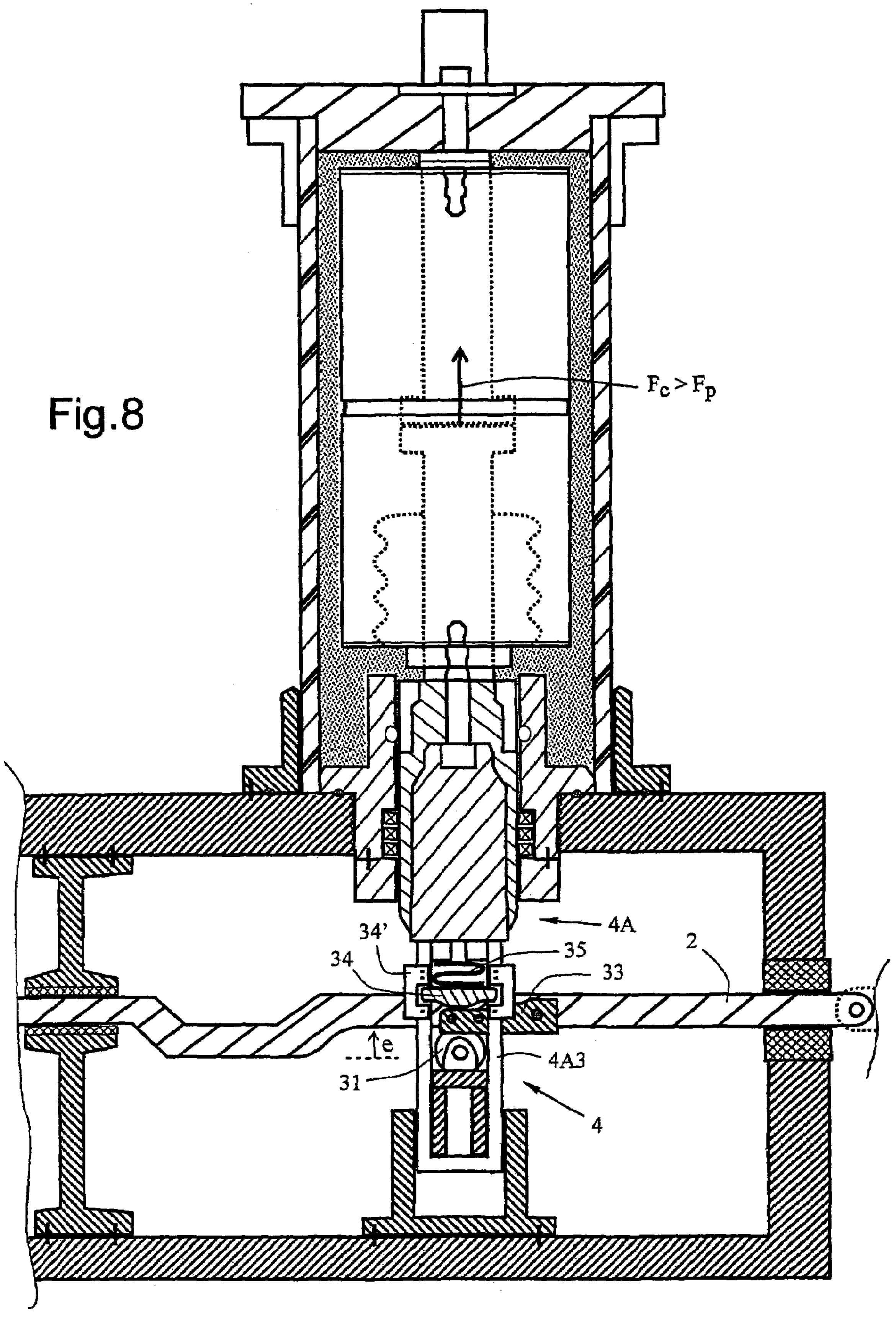
Figure 9:
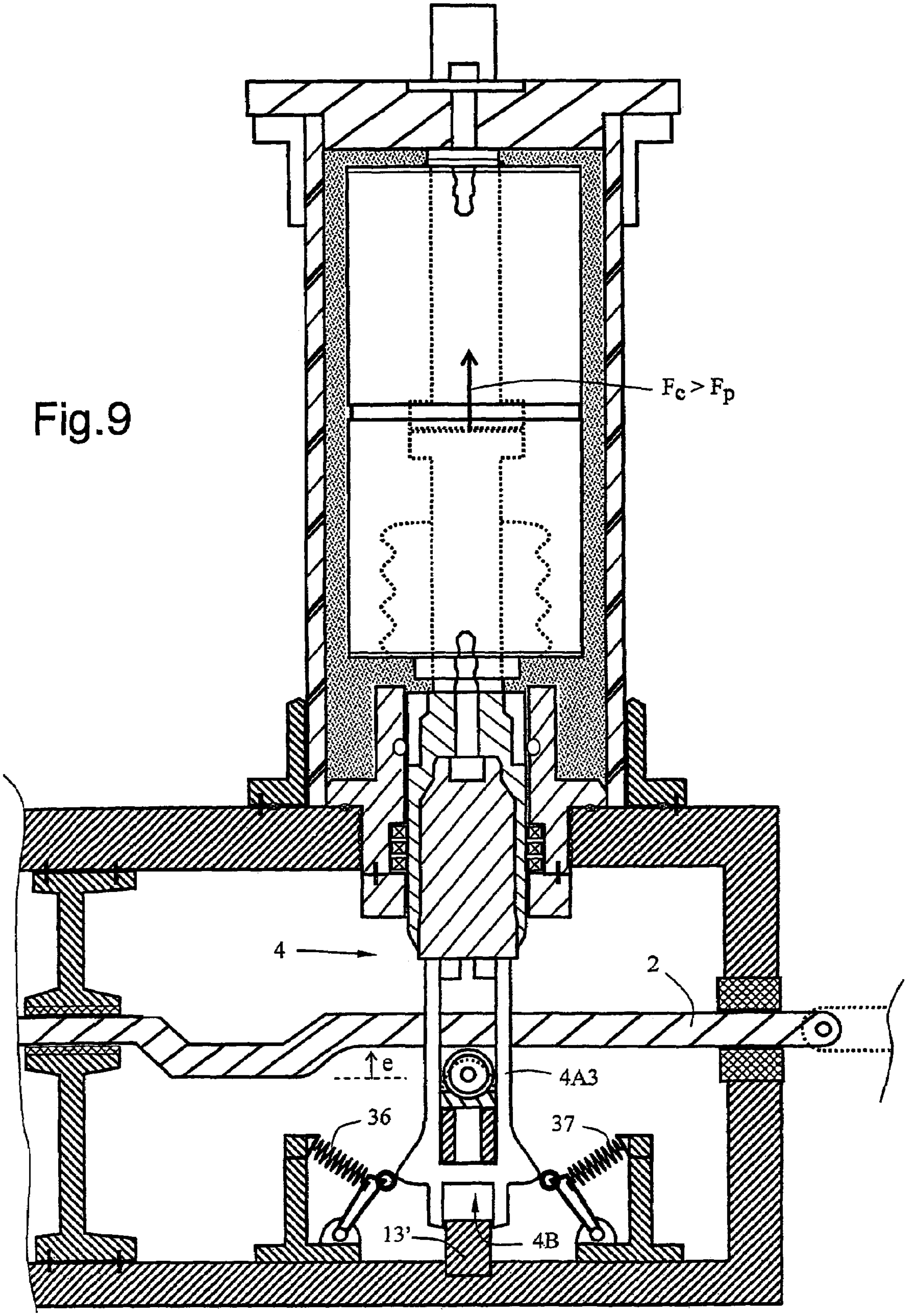
Figure 9A:
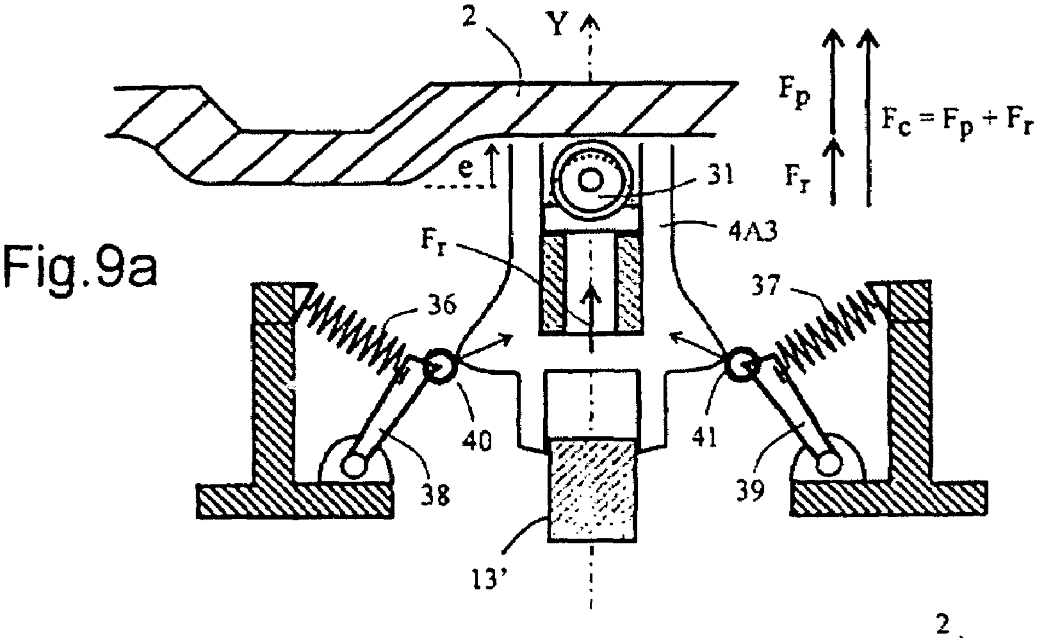
Figure 9B:
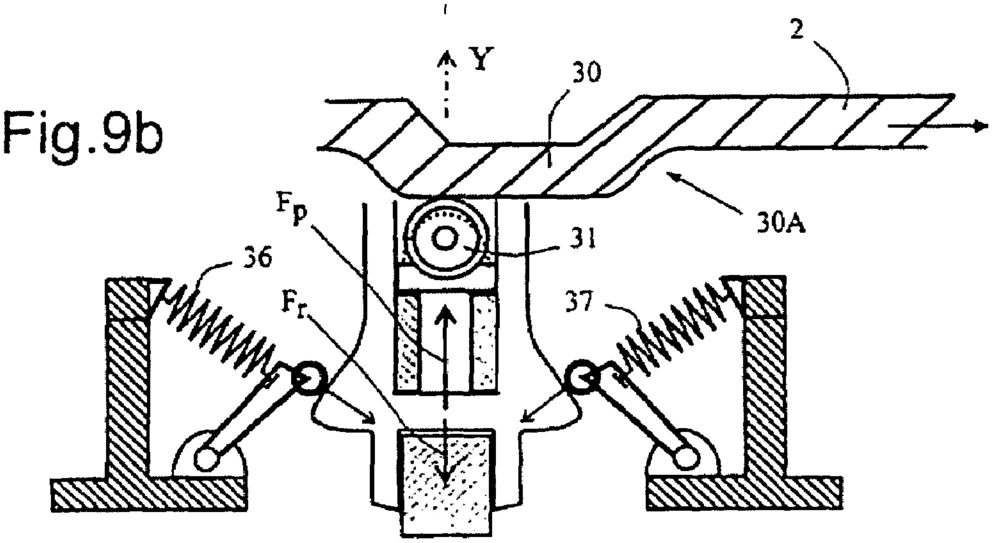
Figure 9C:
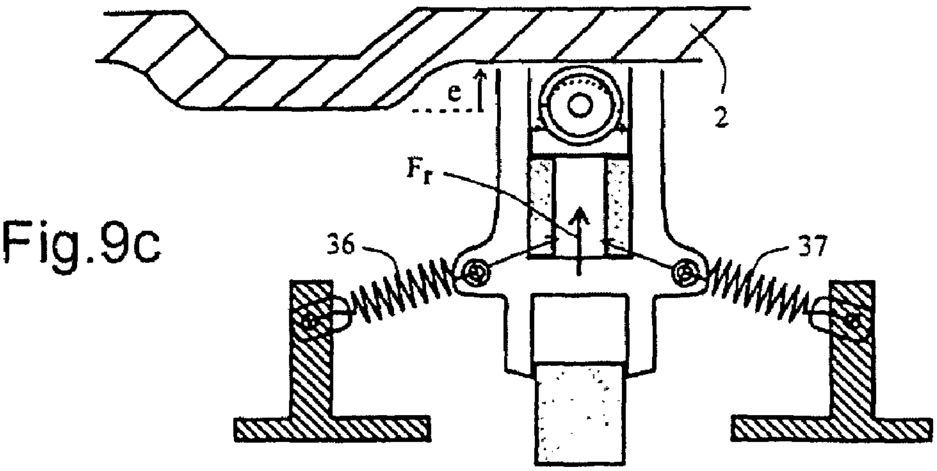
Figure 9D:
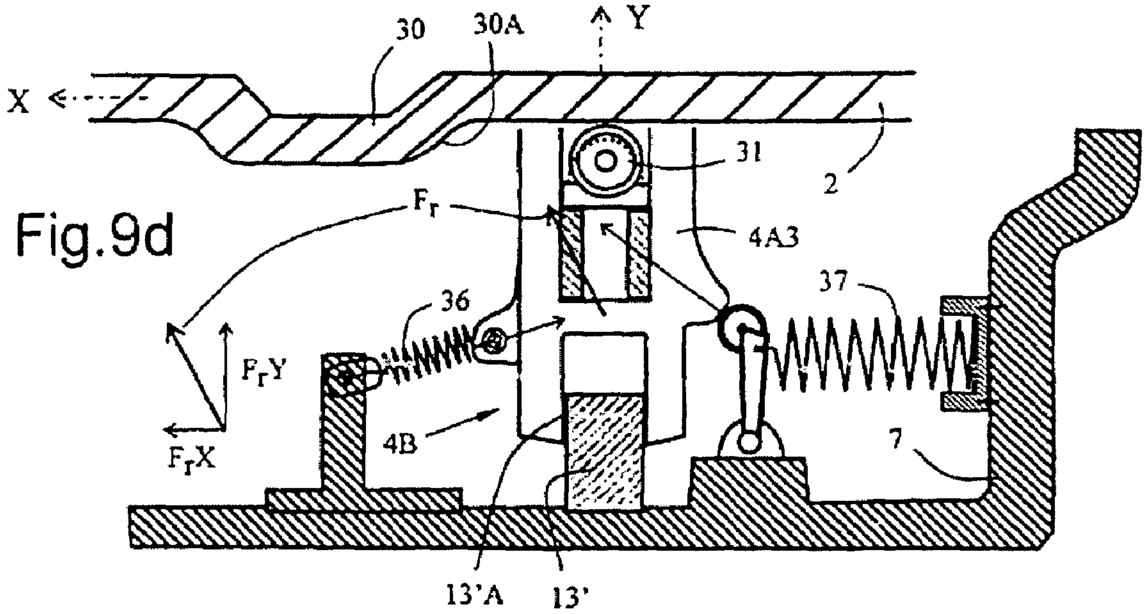
Figure 10:
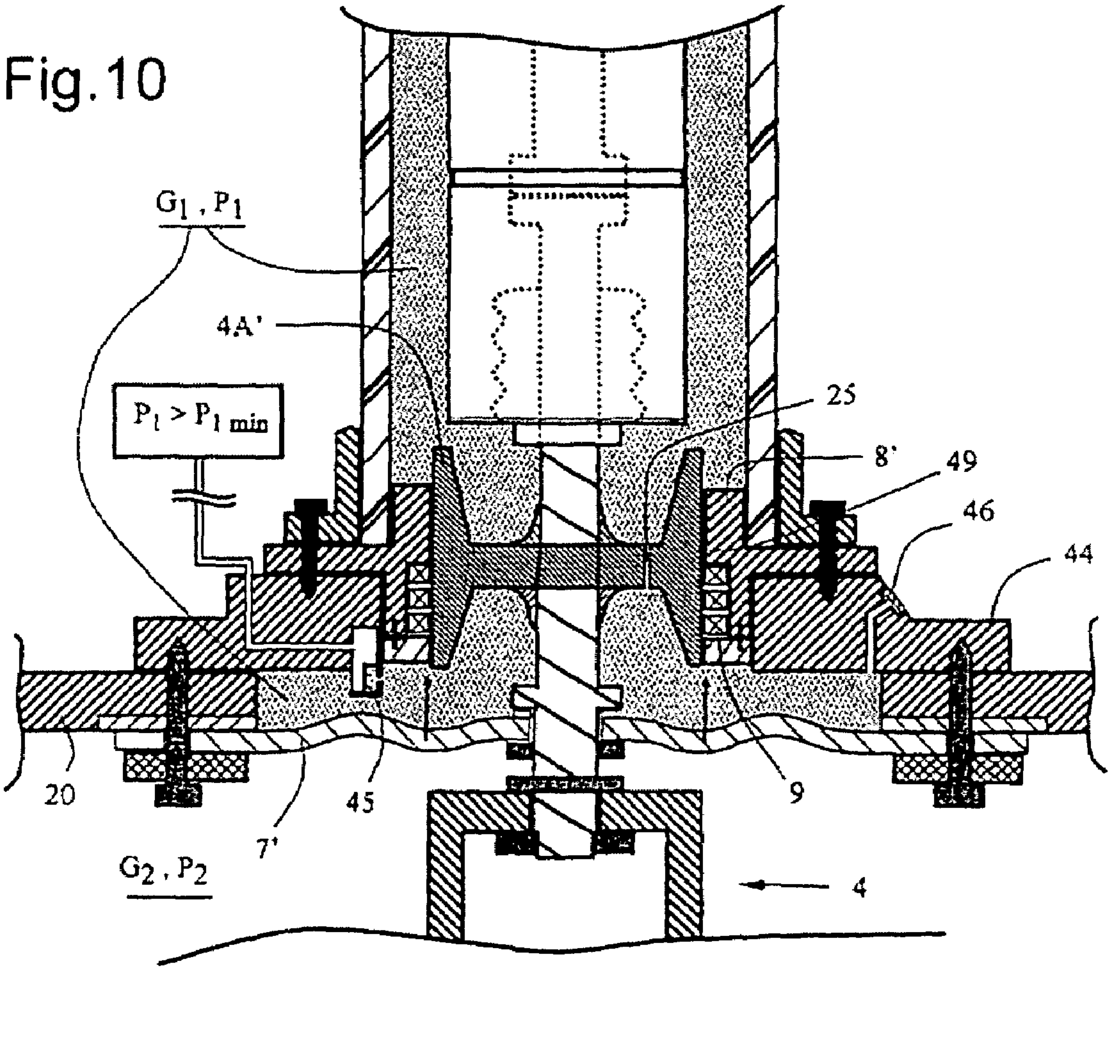
Figure 11:
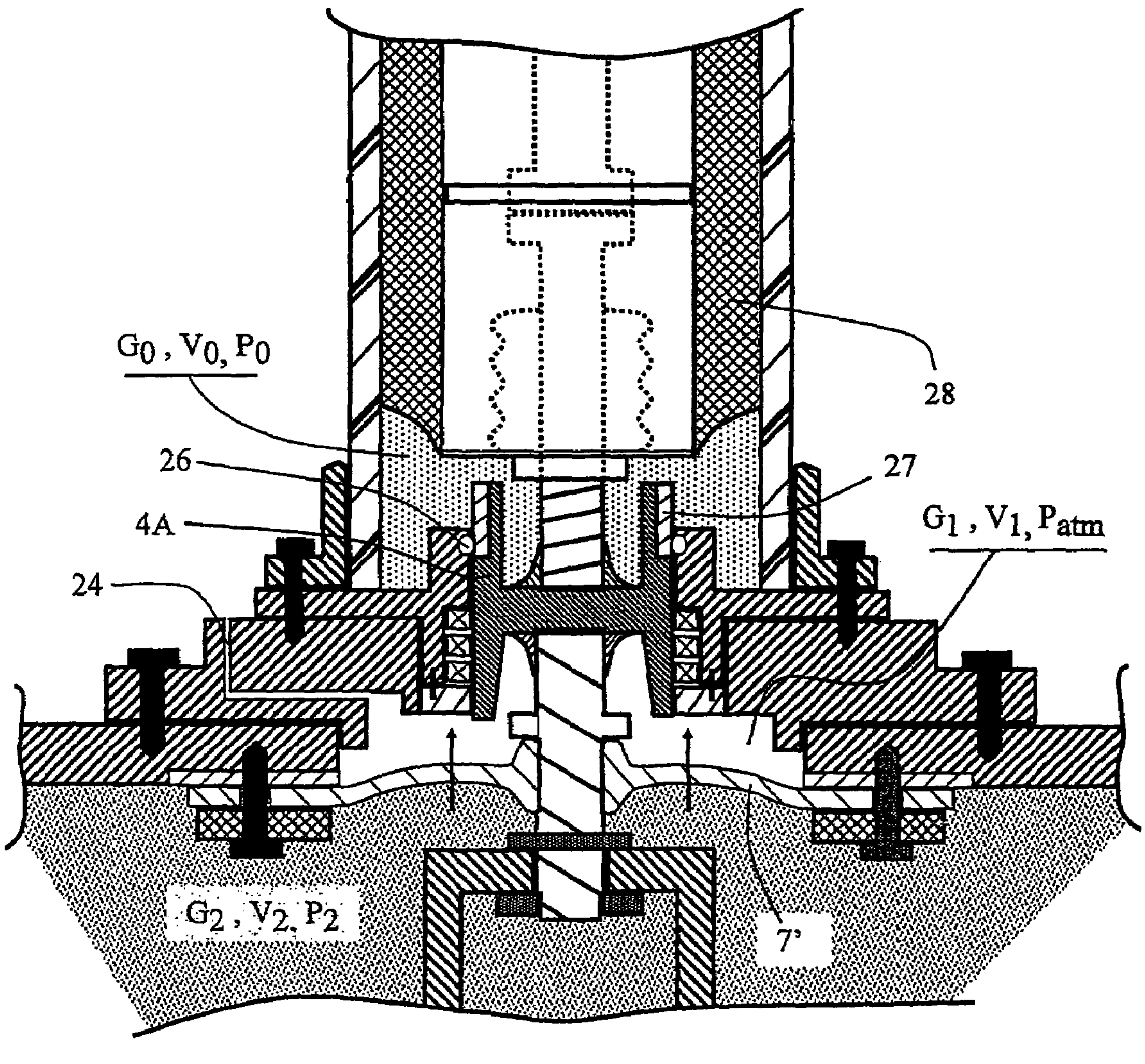

FIG. 7 is a diagrammatic view of another control device of the invention, in which the coupling means for coupling together the main shaft and the auxiliary shaft make it possible to achieve a result analogous to the result procured by the control device of FIG. 3, and in which a safety discharge is provided for any leakage that might occur at the sealing means providing sealing relative to the gaseous insulating fluid;

FIGS. 7*a* and 7*b* are highly diagrammatic views showing the principle whereby the moving contact of the vacuum switchgear is driven by means of the rotary cam of the coupling means shown in FIG. 7;

FIG. 8 is a diagrammatic view of the control device of FIG. 3, to which resilient means have been added to reinforce the contact pressure in the current-passing closed position in which the current passes through the switchgear assembly;

FIG. 9 is a diagrammatic view showing an improvement made to the actuating mechanism for actuating the moving contact of the vacuum switchgear as shown in FIG. 3, making it possible to increase the contact pressure in the switchgear without increasing the drive energy necessary for a control device of the invention;

FIG. 9*a* is an enlargement of the improved actuating mechanism that is shown in FIG. 9, in the position in which the switchgear assembly is in the closed position;

FIG. 9*b* is a diagrammatic view of the actuating mechanism of FIG. 9*a* in the position in which the switchgear assembly is in the open position;

FIG. 9*c* is a diagrammatic view of another improved actuating mechanism for actuating the moving contact of the vacuum switchgear, making it possible to achieve a result analogous to the result procured by the actuating mechanism of FIG. 9;

FIG. 9*d* is a diagrammatic view of another improved actuating mechanism for actuating the moving contact of the vacuum switchgear;

FIG. 10 is a diagrammatic view of an alternative embodiment of the sealing means for providing sealing relative to the gaseous insulating fluid whose pressure is used for operating a control device of the invention; and FIG. 11 is a diagrammatic view showing a variant embodiment of the control device shown in FIG. 10, which includes a safety space at atmospheric pressure and operating on the safety principle used in the control device of FIG. 7.

Figure 1:
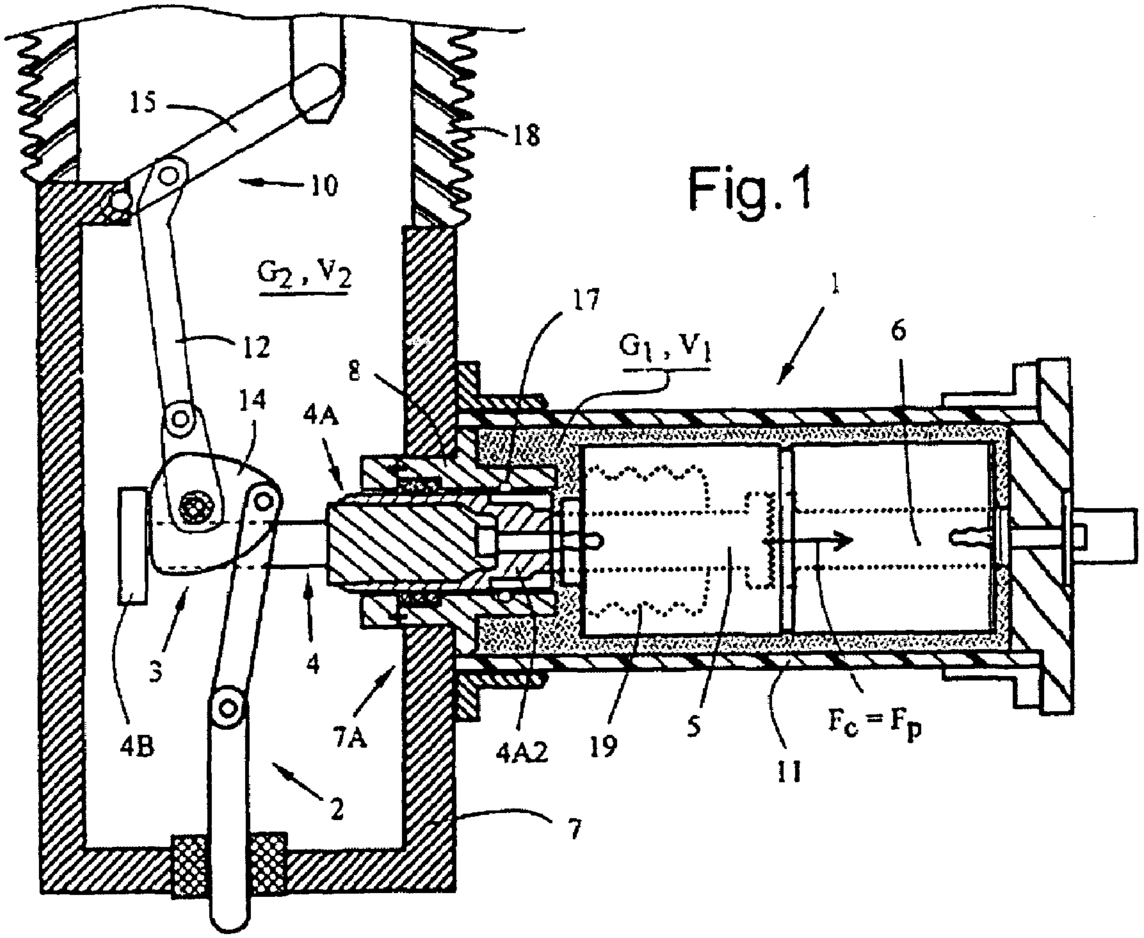
FIG. 1 is a diagrammatic view of a control device of the invention, as applied to an interrupting and disconnection assembly that is known per se and that is shown in the current-passing or closed position.

The control device of the invention that is shown diagrammatically in FIG. 1 is applied to a switchgear assembly, and more precisely to an interrupting and disconnection assembly, as known in particular from Patent Document WO 0074095 A1. That document describes a drive mechanism for actuating in combined manner two items of switchgear that are electrically connected together in series, with a first item of switchgear being vacuum switchgear, and a second item of switchgear being constituted by a disconnector having a pivotally-mounted switch blade disposed in air so as to perform a disconnector function after the current has been interrupted by the first item of switchgear. The drive rod for driving the moving contact of the vacuum interrupter can be actuated to move in translation by means of a pivotally-mounted cam suitable for pressing against a shoulder integral with or secured to the rod at the end thereof. The mechanism for providing the contact pressure is not described in this document, but a conventional spring-loaded and/or electromagnetic control mechanism can be used. The drive link for driving the pivotally-mounted blade is hinged to a lever that is constrained to rotate with the cam, and the main drive shaft is hinged to another lever to drive the cam in rotation.

Thus, by moving, the main drive shaft makes it possible to actuate the two items of switchgear in co-ordinated manner, thereby enabling said items of switchgear to move in a determined time sequence. The profile of the cam in that example makes it possible to separate the contacts of the vacuum interrupter rapidly before the cam turns far enough to separate the pivotally-mounted switch blade from the fixed contact of the disconnector. That corresponds to a normal sequence for such an interrupting and disconnection assembly.

The interrupting and disconnection assembly shown in FIG. 1 is similar in many respects to the assembly described in Patent WO 0074095 A1. The first modification made by the invention for that state of the art consists in providing an enclosure filled with a gaseous insulating fluid $G_2$ under a pressure $P_2$ and whose volume $V_2$ contains the disconnector switchgear 10 and a large portion of the control device. The enclosure comprises a metal casing 7 which is electrically connected to the pivotally-mounted blade 15 of the disconnector 10 and which is open in the vicinity of the disconnector 10 so as to be assembled in leaktight manner to one end of an insulating sheath 18. The fact that the disconnector is disposed in a gaseous medium under pressure that has dielectric insulation properties that are better than the dielectric insulation properties of ambient air makes it possible to increase the dielectric strength of the disconnector in the open position, or else to reduce the dimensions of the disconnector without reducing its dielectric strength.

The casing 7 constitutes one of the two poles of the disconnector, and the insulating sheath 18 provides insulation in air between the casing and the other pole that supports the fixed contact 16 of the disconnector. It is disposed directly in air, and it provides sealing between the insulating gas $G_2$ and the air. The main drive shaft 2 comprises a portion that can be moved in translation and that passes through the casing in leaktight manner so as to be connected to a control mechanism (not shown). Similarly to the means in the device of WO 0074095, coupling means 3 comprise a pivotally-mounted cam 14 secured to a lever which is hinged to a drive link 12 for driving the pivotally-mounted blade 15. The means 3 make it possible to couple the respective movements of the main shaft 2 and of the auxiliary shaft 4 which acts as a drive rod for driving the moving contact 5 of the vacuum interrupter 1. The contact 5 is shown in the current-passing closed position, and is pressing against the fixed contact 6 of the vacuum interrupter in order to provide the necessary contact pressure.

In this example, the auxiliary shaft 4 is provided with a piston 4A which passes through a wall 7A of the casing 7 in leaktight manner and which is suitable for being moved inside a bore 8 formed by a part that is mounted in leaktight manner in an opening through said wall 7A. Sealing means 17 for sealing relative to the insulating gas $G_2$ and formed by an O-ring seal are provided between the piston and the bore 8. The piston 4A is provided with at least one electrically conductive portion 4A2 which is assembled in electrical contact with the moving contact 5 of the vacuum interrupter. When the piston 4A moves, the portion 4A2 of the piston also remains in electrical contact with the bore 8 by means of sliding contacts which are, for example, spring O-ring contacts that are known per se.

The bore 8 opens out on the outside of the casing 7 into a volume $V_1$ filled with a fluid $G_1$ maintained at a pressure $P_1$ that is lower than the pressure $P_2$ of the gaseous insulating fluid $G_2$ in the casing. The fluid $G_1$ can be an insulating gas, optionally of the same type as $G_2$, or else a dielectric liquid or gel, or else a small volume of air or of some other gas at the pressure $P_1$ without any particular dielectric properties and provided adjacent to a volume of dielectric gel or solid that surrounds the leaktight chamber of the vacuum interrupter in order to provide dielectric insulation between the two poles of the interrupter. In FIG. 1, the fluid $G_1$ shown is an insulating gas contained in a rigid insulating sheath 11 fixed in leaktight manner against the casing 7 around its bore 8.

The difference between the pressure $P_2$ of the gas $G_2$ inside the casing 7 and the pressure $P_1$ of the gas $G_1$ inside the leaktight sheath 11 applies to the piston 4A a differential pressure force $F_p$ that is the product of the value $P_2-P_1$ multiplied by the section of the piston in the bore 8. As a function of these parameters, the differential pressure force $F_p$ can be organized to guarantee the contact pressure force necessary to hold the contacts 5 and 6 of the vacuum interrupter 1 pressed together even if a short-circuit current flows through the interrupter. It should also be noted that the total differential pressure force that is exerted on the moving contact 5 of the vacuum interrupter 1 is, in reality, the sum of the above-defined differential pressure force $F_p$ and of the pressure force of the gas $G_1$ that is exerted on the sealing metal bellows 19 of the vacuum interrupter, due to the fact that the bellows forms a moving separation between the vacuum in the leaktight chamber of the interrupter and the gas $G_1$ around said chamber. Below, the contact pressure force $F_c$ is defined as being the force to be exerted on the moving contact 5 of the vacuum interrupter in addition to the pressure force of the gas $G_1$ which is exerted on the sealing bellows of the interrupter, in order to hold the contacts of the interrupter pressed together under specified current conditions.

Figure 2:
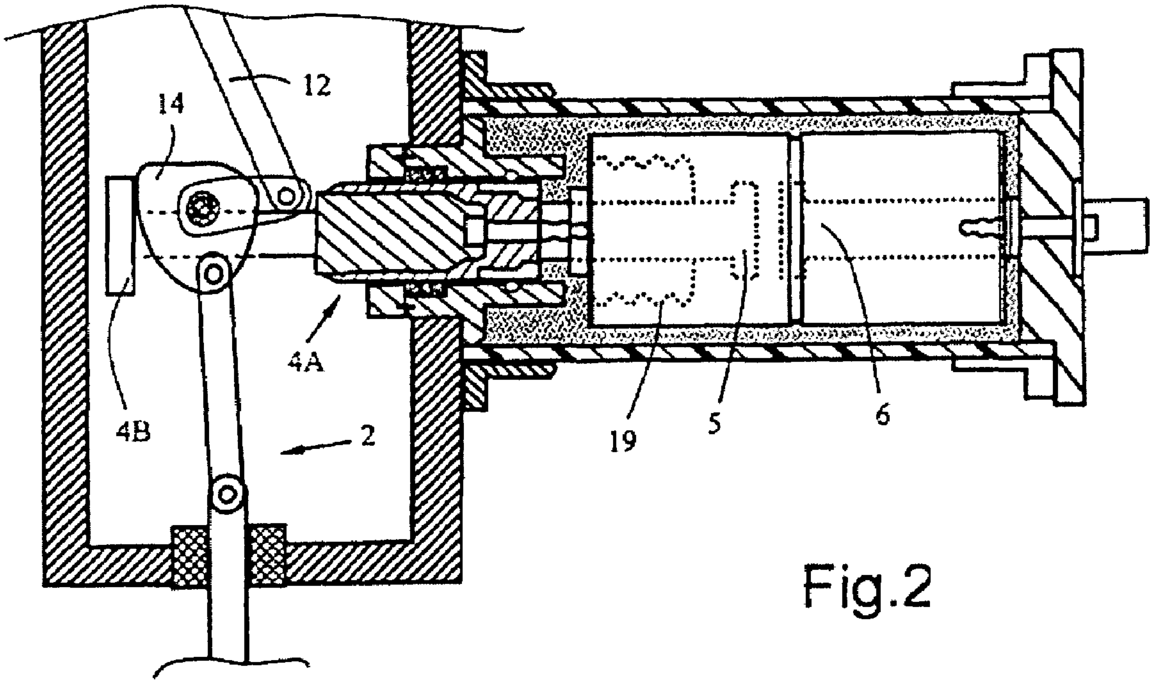
FIG. 2 is a diagrammatic view of the control device of FIG. 1, shown in the current-interrupting open position in which the switchgear assembly interrupts the current.

In FIG. 2, the control device of FIG. 1 is shown diagrammatically in the open position in which the current is interrupted by the switchgear assembly. The portion of the disconnector that includes the pivotally-mounted blade is not shown, but it can be understood by the position of the drive link 12 for driving the pivotally-mounted blade of the disconnector that said blade is open. The main shaft 2 moving towards the bottom of the figure, driven by a control device (not shown), causes the pivotally-mounted cam 14 to turn, the profile of the cam being organized to press against the shoulder 4B of the auxiliary shaft 4 as of the beginning of the turning. The force with which the cam 14 presses against the shoulder 4B is organized to be sufficient to exceed the differential pressure force $F_p$ which remains substantially constant over the entire stroke of the piston 4A. When the piston comes to the end of its stroke, as shown in the figure, the contacts 5 and 6 of the vacuum interrupter are separated with spacing organized not to exceed the elasticity limits of the metal bellows 19 of the interrupter.

In FIG. 3, a control device of the invention is shown diagrammatically in an application for a switchgear assembly referred to as a "hybrid interrupting circuit-breaker" or a "hybrid circuit-breaker", which associates the switchgear that performs interruption in a vacuum with switchgear that performs interruption in a gas. Below, these two items of switchgear are referred to respectively as the "vacuum interrupter" and as the "gas interrupter". The gas interrupter 10 (not shown on the left of the figure) typically has moving contact equipment comprising a moving arcing contact suitable for being driven in translation by the main shaft 2 for driving the hybrid circuit-breaker. The main shaft is connected conventionally via an insulating link to a control mechanism (not shown on the right of the figure). The position of the shaft 2 corresponds, in this figure, to the closed state of the hybrid circuit-breaker, i.e. the state in which a permanent current passes through the circuit-breaker. The vacuum interrupter 1 and the axis along which the auxiliary shaft 4 moves in translation are disposed along the same axis Y that is substantially perpendicular to the axis X along which the main shaft 2 moves in translation, but it is possible to provide an angle different from 90° between said axes.

The vacuum interrupter 1, the bore part 8, the piston 4A and the sealing means 17 are of the same type as the corresponding elements in FIG. 1. Preferably, the O-ring seal that constitutes the sealing means 17 is not in contact with the electrically conductive socket-shaped portion 4A2 of the piston 4A, and is disposed in a recess in the part that forms the bore 8 so as to press permanently against an annular element 27 mounted in leaktight manner on said portion 4A2. The annular element 27 is not necessarily electrically conductive, and it is organized to be suitable for being moved while pressing against the O-ring seal without significantly affecting the quality of the sealing. Leakage of the gaseous insulating fluid $G_2$ towards the volume $V_1$ of gaseous insulating fluid $G_1$ can thus be maintained at a very low level over a year of operation of the hybrid circuit-breaker.

Ideally, an average value over time substantially equal to the loss of the gas $G_1$ from the volume $V_1$ to the outside of the insulating sheath 11 is sought for the quantity of gas $G_2$ leaking towards the volume $V_1$. In this way, if the gases $G_1$ and $G_2$ are of the same type or have similar dielectric properties, the pressure $P_1$ of gas in the sheath 11 can be maintained within a range defined by allowable extreme values $[P_{1min}, P_{1max}]$ for preserving the dielectric strength between the two poles of the vacuum interrupter 1 while not exceeding a maximum value that is critical for the mechanical structure of the interrupter. For reasons of safety, a pressure measurement device $P_1$ can be provided in particular for checking that said pressure remains higher than the bottom limit $P_{1min}$ and for preventing the hybrid circuit-breaker from being disengaged if $P_1$ descends below said limit. Conversely, in the event that the critical maximum value $P_{1max}$ is exceeded, it is possible to provide a safety device constituted, for example, by a valve 23 having a pre-stressed spring. Such a valve can be installed, for example, in an opening in the metal disk 22 that carries the fixed contact 6 of the vacuum interrupter 1 and that closes the sheath 11, and such a valve is organized to open slightly in order to release to the atmosphere a small quantity of gas $G_1$ whose pressure exceeds the critical maximum value. Naturally, this solution assumes that the gas $G_1$ is not dangerous for the atmosphere, and it is therefore advantageous to use pure nitrogen when such a solution is implemented.

The difference between the respective pressures $P_2$ and $P_1$ of the two gaseous insulating fluids $G_2$ and $G_2$ procures a certain force $F_p$ which is applied to the auxiliary shaft 4 and which, in this example, provides the entire contact pressure force $F_c$ by itself, as in the device of FIG. 1. The force Fp is proportional to the square of the diameter D of the piston.

Analogously to the casing in the switchgear assembly shown in FIG. 1, the metal casing 7 is open in the vicinity of the gas interrupter 10 in order to be assembled in leaktight manner to one end of an insulating sheath (not shown) which encloses the interrupting chamber of the gas interrupter. The casing 7 constitutes one of the two poles of the gas interrupter 10 by being electrically connected to the moving contact equipment (not shown) of said interrupter. The conductive portion 4A2 of the piston 4A remains in electrical contact with the bore 8 by means of sliding contacts 9. The hybrid circuit-breaker constituted in this way is of the air-insulated type like the device of FIG. 1.

The coupling means 3 for coupling together the main shaft 2 and the auxiliary shaft 4 comprise a cam 30 which is constrained to move in translation with the main shaft 2 and which can be formed by a segment 2A of said shaft 2 as shown in the figure. The surface of the cam 30 is organized to be suitable for guiding a rolling element or wheel 31 which is constrained to move with the auxiliary shaft 4. The axle of said wheel is mounted on a bearing carried by a cradle 4A3 which constitutes a portion of the auxiliary shaft 4. This cradle is fixed to a portion 4A1 inserted into the electrically conductive portion 4A2 of the piston 4A, said portion 4A1 not necessarily being conductive because electricity conduction between the bore 8 and the moving contact 5 of the interrupter is provided by the portion 4A2. An end portion 4B of the cradle 4A3 of the auxiliary shaft 4 is suitable for sliding in translation in a guide element 13 which is fixed to one face 7B of the casing 7, which face is opposite the face that constitutes the wall 7A through which the piston 4A of the auxiliary shaft passes.

Figure 4:
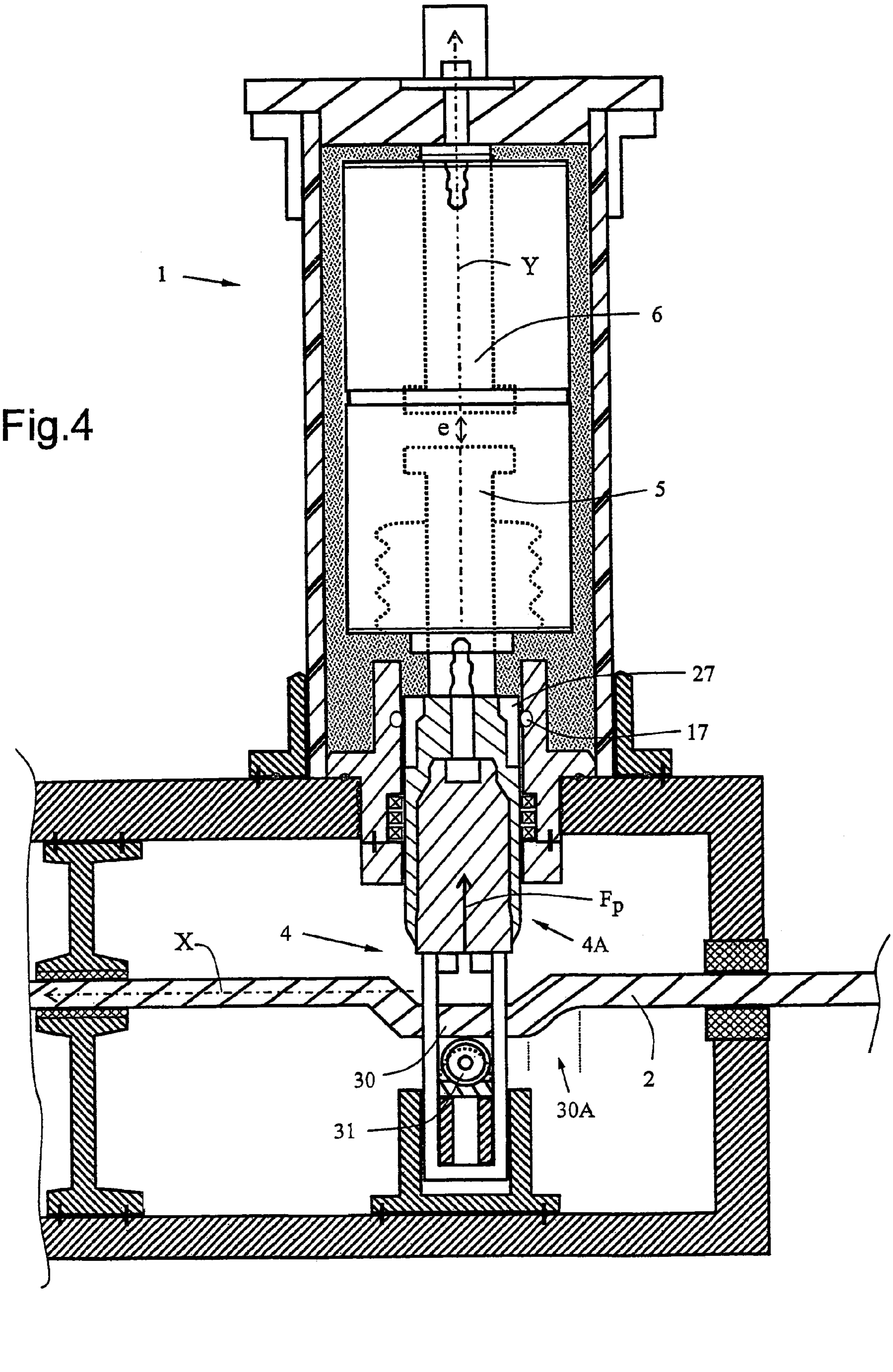
FIG. 4 is a diagrammatic view of the control device of FIG. 3, showing the position in which the switchgear assembly is open.

Thus, when the hybrid circuit-breaker is disengaged to interrupt the current, the main shaft 2 being driven in translation along the axis X makes it possible, after a determined amount of lost motion, to drive the auxiliary shaft 4 in translation along the axis Y until the contacts 5 and 6 of the vacuum interrupter are separated completely, as shown in FIG. 4. The lost motion of the main shaft 2 is defined herein as the distance to be traveled by the shaft, and thus also to be traveled by the moving arcing contact of the gas interrupter in order for the cam 30 to come into contact with the wheel 31 from the closed state of the circuit-breaker. It is well known that such lost motion is generally necessary in a hybrid circuit-breaker so that the arcing contacts of the gas interrupter separate at a certain relative speed substantially at the instant when the contacts of the vacuum interrupter start separating. The lost motion can also sometimes be referred to as the "run-up" distance for bringing the arcing contacts of the gas interrupter up to the required relative speed, and it corresponds typically to the distance of mutual overlap of the two arcing contacts of the interrupter in a "thimble" contact configuration.

The cam and wheel coupling used in this example between the main shaft 2 and the auxiliary shaft 4 implements a principle that is well known in the field of movement-deflecting transmission mechanisms. Such a coupling has also long been used for control systems for controlling in co-ordinated manner a plurality of electrical switchgear items including a vacuum interrupter. In particular, Patent Document EP 0 132 083 shows a device making it possible to actuate a vacuum interrupter and a disconnector from a drive shaft for driving the moving contact of the disconnector that is moved in translation by a single control mechanism. A cam constrained to move in translation with said shaft is coupled to a wheel that is constrained to move in translation with the moving contact of the vacuum interrupter, which interrupter is disposed perpendicularly to the shaft. A contact pressure spring permanently applies thrust against the moving contact of the vacuum interrupter, making it possible to obtain the contact pressure necessary in the interrupter when said interrupter is in the closed position.

The coupling means 3 used in the present control device are thus analogous to those described in EP 0 132 083. It can be noted that the invention makes it possible advantageously to omit the contact pressure spring that is essential in a conventional control device, or, in any event, to reduce the force to be exerted by a mechanical spring device as shown below in the descriptions of FIGS. 8 and 9. Preferably, in the present control device of the invention, the wheel 31 and the main shaft 2 are organized so that a small amount of clearance exists between these two elements when the hybrid circuit-breaker is in the closed state, as shown in FIG. 3, and also while the main shaft is traveling over the lost motion during disengagement of the circuit-breaker. Over the working life of the hybrid circuit-breaker, it is known that the contacts of the vacuum interrupter can be eroded under the action of electric arcs that strike while they are separating, and over time, such erosion can lead the moving contact to become closer to the fixed contact when the interrupter is in the closed state. The above-mentioned small amount of clearance is provided in order to accommodate the moving contact coming slightly closer in this way, and it thus makes it possible to prevent any stress caused by the contact pressure force on the auxiliary shaft 4 from being applied to the main shaft 2 when the hybrid circuit-breaker is in the closed state.

The height of the cam 30 along the axis Y along which the auxiliary shaft 4 moves in translation is chosen as a function of the spacing e desired for the contacts 5 and 6 of the vacuum interrupter, as shown in FIG. 4.

In FIG. 4, the control device of FIG. 3 is shown diagrammatically when the switchgear assembly is in the open position. For reasons of simplification, the optional safety device for relieving excessive gas pressure in the insulating sheath of the vacuum interrupter 1 is not shown in this figure. Starting from the closed state of the hybrid circuit-breaker as shown in FIG. 3, the circuit-breaker is disengaged by the main shaft 2 moving in translation along the axis X towards the right of the figure in order to separate the arcing contacts of the gas interrupter 10. Once the main shaft 2 has traveled over the lost motion, the main portion 30A that corresponds to the "opening" slope of the cam 30 comes into contact with the roller 31 to drive the auxiliary shaft 4 in translation along the axis Y towards the bottom of the figure. The moving contact 5 of the vacuum interrupter thus adopts a predetermined movement profile by means of the shape of the main portion 30A. The auxiliary shaft 4 ceases to move in translation when the wheel 31 leaves the main portion 30A of the cam, i.e. when that surface of the cam against which the wheel presses becomes parallel to the axis X again. It is thus possible to continue to move the arcing contacts of the gas interrupter apart after the contacts 5 and 6 of the vacuum interrupter 1 have been fully separated with the desired spacing e, and until the end of the circuit-breaker function shown in FIG. 4. It can be noted that, while the vacuum interrupter 1 is being opened, the O-ring seal that constitutes the sealing means 17 remains continuously pressed against the annular element 27 with which it imparts gastightness to the piston 4A.

In the end-of-circuit-breaker-function position shown in FIG. 4, the wheel 31 presses against the cam 30 with a force equal to the force $F_p$ procured by the difference between the respective pressures of the two gases on either side of the piston 4A. The main shaft 2 and its cam 30 thus lock the moving contact 5 of the vacuum interrupter in its open position.

Figure 5:
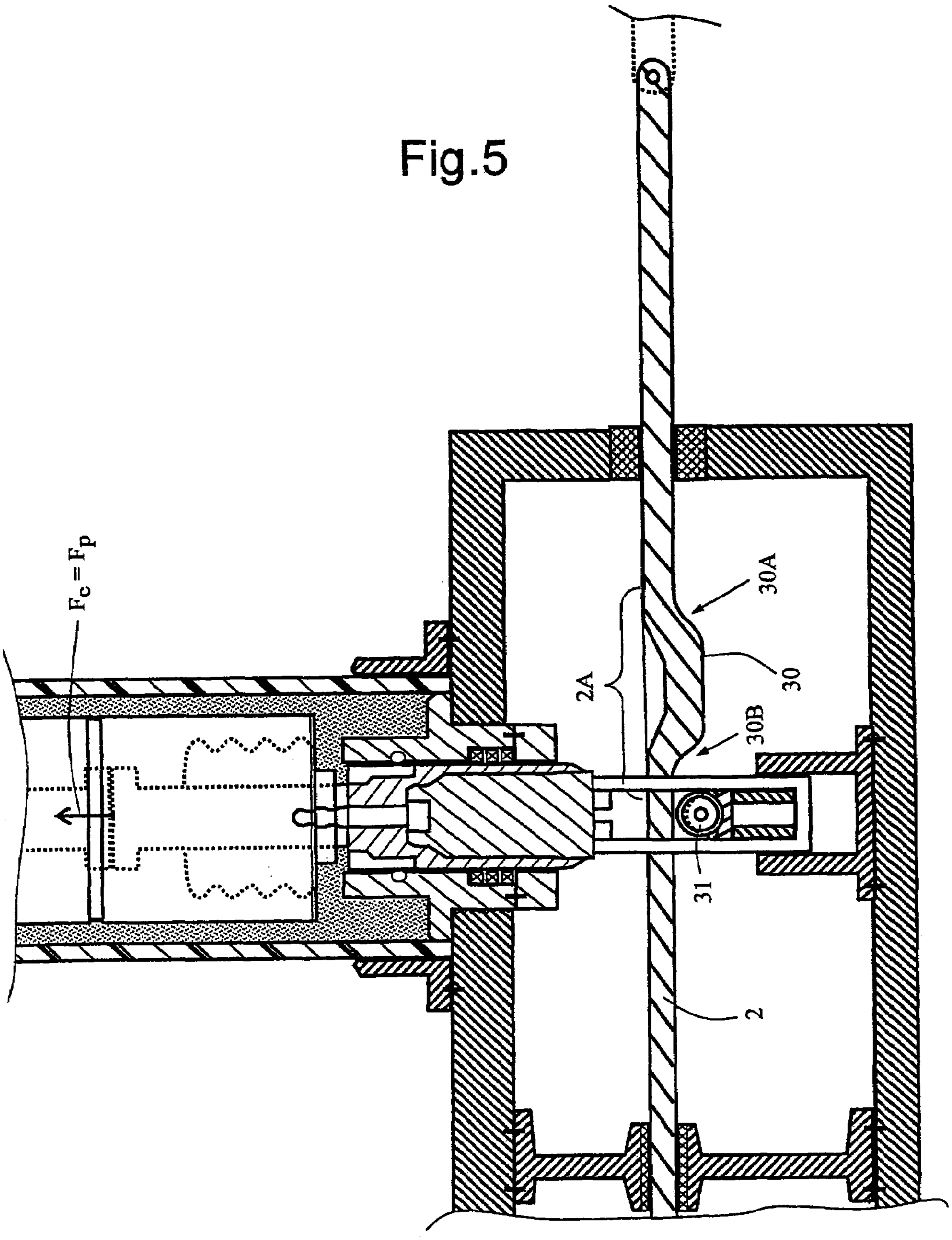
FIG. 5 is a diagrammatic view of a control device analogous to the control device of FIG. 3, and in which provision is made for it to be possible for the vacuum switchgear to be re-closed after the end of the circuit-breaker function performed by the gas switchgear.

FIG. 5 diagrammatically shows a control device analogous to the control device of FIG. 3, and in which the vacuum interrupter is closed again after the end of the circuit-breaker function performed by the gas interrupter. The additional stroke traveled by the main shaft 2 after the end of the circuit-breaker function can make it possible for the switchgear assembly to perform a disconnector function in addition to the circuit-breaker function, due to the fact that the arcing contacts of the gas interrupter can be far enough apart to guarantee a disconnection distance in the gaseous insulating fluid $G_2$ of the interrupter. That segment 2A of the main shaft 2 on which the cam 30 is formed is longer than shown in the drawing of the cam of the device of FIGS. 3 and 4, in order to make it possible to provide on the cam a secondary portion 30B with a "re-closure" slope. The re-closure slope slopes the other way from the opening slope of the main portion 30A of the cam.

While the main shaft 2 is traveling over the additional stroke, the slope profile of the secondary portion 30B makes it possible for the wheel 31 and thus for the auxiliary shaft 4 to move closer to the fixed contact of the vacuum interrupter so that the moving contact comes to press against said fixed contact with an instantaneous speed that is almost zero at the time of the impact. The same contact pressure force as the contact pressure force corresponding to the closed state of the hybrid circuit-breaker is applied to the moving contact of the vacuum interrupter after it re-closes. The re-closure makes it possible to prevent the portions electrically connected to the moving contact of the vacuum interrupter from being at a floating potential when the hybrid disconnector-circuit-breaker is in the disconnection position, because such a floating potential could damage the vacuum interrupter when the line that is disconnected by the switchgear assembly is in certain configurations.

Figure 6:
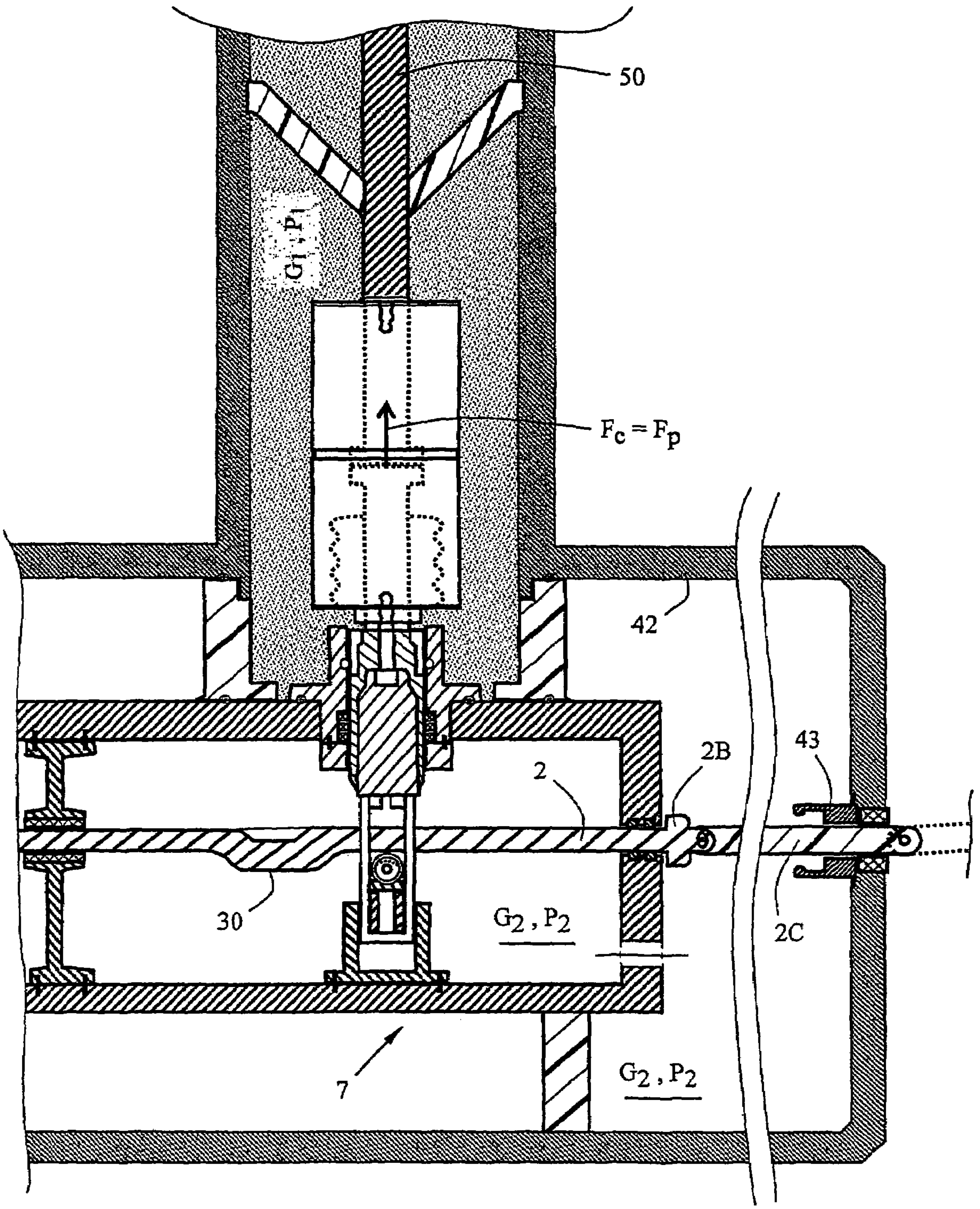
FIG. 6 is a diagrammatic view of a control device analogous to the control device of FIG. 5, in an application for a metal-clad switchgear assembly.

FIG. 6 diagrammatically shows a control device analogous to the control device of FIG. 5, in an application for a metal-clad switchgear assembly. It can be noted that, in this type of application, the casing 7, which is at the potential of the high voltage when in service, must be electrically insulated from the gastight metal cladding 42 that constitutes the metal cladding of the switchgear assembly. Since the gastight cladding encloses the gaseous insulating fluid $G_2$ of the gas circuit-breaker at a certain pressure $P_2$, it is not essential for the casing 7 also to be gastight, unless, for example, provision is made for the gas pressure in the casing to be higher than in the remaining space between the casing and the cladding. In the present application, the casing 7 is open, and performs the same electricity conductor and mechanical support function as in the above-described control devices of the invention for air-insulated switchgear assemblies.

The main shaft 2 and its cam 30 are organized to enable the switchgear assembly to perform a disconnector function in addition to its circuit-breaker function. Optionally, a conductive portion of the main shaft 2 is electrically connected to the casing 7 via sliding contacts and is provided at its end outside the casing with a block 2*b* to which an insulating link is hinged that forms a portion 2C of the shaft 2 and that passes in leaktight manner through the cladding 42 of the metal-clad assembly so as to be connected to a control mechanism (not shown). The block 2B is organized to come into electrical contact with a terminal 43 which is fixed to the cladding 42 and through which the insulating link 2C of the shaft 2 passes, by means of the shaft 2 traveling over an additional stroke after the end of the disconnector function. The casing 7 is thus connected to the grounding potential of the cladding 42 via the conductive portion of the main shaft 2. This makes it possible to ground the metal-clad line that is connected to the fixed contact of the vacuum interrupter, since said interrupter has been re-closed at the end of the circuit-breaker function and since, therefore, its fixed contact is electrically connected to the casing 7. The central conductor 50 of the metal-clad line is, in this example, immersed in the gas $G_1$ that surrounds the leaktight chamber of the vacuum interrupter and whose pressure $P_1$ is lower than the pressure $P_2$ of the gas $G_2$ that surrounds the gas interrupter. The resulting switchgear assembly is a metal-clad hybrid disconnector-circuit-breaker that can also perform an additional function of grounding on one side of the line.

FIG. 7 diagrammatically shows another control device of the invention, shown when the switchgear assembly is in the closed state. The auxiliary shaft 4 is identical to the auxiliary shaft of the control device of FIG. 3. Like that shaft, it carries a wheel 31 organized to be moved by a cam, and is suitable for sliding in translation in a guide element 13 fixed to the casing 7. In this example, the coupling means between the main shaft 2 and the auxiliary shaft 4 use a rotary cam 14' for acting on the wheel 31. The rotary shaft 48 of the cam 14' is mounted on bearings fixed to the casing 7, and it is constrained to rotate with a larger wheel 32 which is provided with a circular set of teeth meshing with a rack 21 carried by the main shaft 2. Thus the main shaft moving in translation causes the cam 14' to rotate, the profile of the cam being organized to act on the wheel 31 once the main shaft has traveled over a certain amount of lost motion, in a manner co-ordinated with the separation of the contacts of the gas interrupter.

The dielectric medium around the leaktight chamber of the vacuum interrupter is, in this example, constituted by a dielectric material 28 that is overmolded around said chamber and that is contained in an insulating sheath 11. In known manner, the insulating sheath 11 can also be made of the overmolded dielectric material 28 if said material has sufficient mechanical rigidity, and if it stands up to the elements. Only a small volume $V_1$ of gaseous fluid $G_1$ is adjacent to the leaktight chamber of the vacuum interrupter, between that end-plate of the chamber through which the moving contact of the interrupter passes and the bore part 8 in which the piston 4A of the auxiliary shaft 4 can slide. The gas $G_1$ is not necessarily an insulating gas because it does not have to provide dielectric insulation between the poles of the vacuum interrupter, and it is not necessary to monitor the pressure of said gas because any leakage would have no consequences on the dielectric insulation between the poles.

Sealing means 26 are provided in this example for preventing any communication between the volume $V_1$ and the outside atmosphere, and the gas $G_1$ is fed in to a pressure higher than atmospheric pressure so that any leakage from the volume $V_1$ takes place in one direction only, namely towards the outside atmosphere. The aim of this provision is to preserve a volume $V_1$ that is free, in particular, from the humidity and dust of the outside atmosphere. Preferably, the gas $G_1$ is fed in in the factory, during assembly of the switchgear assembly, e.g. at a pressure of about twice atmospheric pressure and which corresponds to the provisional filling pressure of gas $G_2$ in the casing 7 for safe transport of the switchgear assembly, before it is filled finally on site for the purpose of being used. It is therefore not necessary to fill or to check the volume $V_1$ after the switchgear assembly has left the factory, which is advantageous for the operator. It should be noted that the sealing means 26 are not essential, because it would be acceptable for the volume $V_1$ to be filled with air in communication with the outside atmosphere if the end plate through which the moving contact of the vacuum interrupter passes is organized to operate in such a configuration.

The bore part 8 is provided with a radial orifice 24 which puts the outside atmosphere into communication with a gap between the piston 4A and the bore 8 and which opens out into said gap between the sealing means 17 and the vacuum interrupter, so that any leakage of gas $G_2$ from the volume $V_2$ of the casing 7 through the sealing means 17 is discharged to the outside atmosphere. Thus, any such leakage of the gas $G_2$ does not cause an increase in the gas pressure in the volume $V_1$, and it is thus unnecessary to install between said volume and the outside atmosphere a safety device such as a valve for discharging excessive pressure such as the valve 23 of the device of FIG. 3. The radial orifice 24 constitutes in itself a safety discharge in the event of leakage of the gas $G_2$ through the sealing means 17.

FIGS. 7*a* and 7*b* are highly diagrammatic views showing the principle whereby the moving contact of the vacuum interrupter is driven by means of the rotary cam 14'. FIG. 7*a* reproduces the configuration of FIG. 7, in which the contacts of the vacuum interrupter 1 are closed. In practice, it can be noted that a small amount of clearance is necessary between the rolling surface of the wheel 31 and the surface of the circular arc shaped portion of the cam 14' which corresponds to the lost motion.

FIG. 7*b* corresponds to the configuration of FIG. 7 after the hybrid circuit-breaker has been disengaged, and at the time when the contacts of the vacuum interrupter are fully separated with the desired spacing e. At this time, the cam has been turned through nearly 180°, and it can continue to turn while the spacing e is maintained. It can be noted that the profile of the cam would make it possible for the vacuum interrupter to re-close by the main shaft 2 traveling over an additional stroke and naturally provided that the rack 21 is of sufficient length.

Coupling via a rotary cam makes it possible to obtain a result analogous to the result procured by coupling using a cam moving in translation as in the control device of FIG. 3. The control device of FIG. 7 can offer the advantages firstly of making it possible to reduce the relative speed of impact between the respective surfaces of the cam 14' and of the wheel 31 at the end of the lost motion, and secondly of making it possible to reduce considerably the transverse forces exerted on the main shaft 2, thereby making it possible, in particular to limit the wear on the longitudinal guide elements of the shaft. However, such coupling is more costly to implement than coupling using a cam that moves in translation.

The control device shown diagrammatically in FIG. 8 constitutes an improvement to the control device of FIG. 3. Resilient compression mechanical means are added to reinforce the contact pressure in the closed position in which the switchgear assembly passes current. The resilient compression means comprise a spring 35 which is mounted in prestressed manner on the auxiliary shaft 4 along the axis Y of the shaft. The spring 35 has an end which bears against a pusher element 34 received in an abutment member 34' fixed to the cradle 4A3 of the shaft 4, and has another end which bears against the piston 4A of the shaft. The pusher element 34 is suitable for being brought closer to the other end of the spring 35, by lifting away from its abutment position held by the member 34', when the spring 35 is compressed over a small amplitude under the action of a finger 33 which is fixed to the main shaft 2 and which, in this example, is organized to be suitable for sliding in abutment against the pusher element 34.

Such compression of the spring 35 makes it possible to apply to the auxiliary shaft 4 a force in addition to the differential pressure force $F_p$ procured by the difference between the respective pressures of the two gaseous insulating fluids, and that reinforces the contact pressure force $F_c$ when the switchgear assembly is in the closed position, i.e. when the gas switchgear is in the closed position. Such a configuration can be advantageous if the force $F_p$ is insufficient on its own to provide the contact pressure force $F_c$ necessary to withstand the electrodynamic forces tending to move the contacts of the vacuum interrupter apart when a short-circuit current flows. This configuration can be preferred to the alternative which consists in increasing the diameter of the piston 4A in order to increase the differential pressure force, because it makes it possible to maintain a minimum contact pressure force value even in the event of a major gas leak form the volume of the gas interrupter. Such a minimum contact pressure force value guaranteed by a mechanical spring makes it possible to keep the switchgear assembly in service in its closed position in order to pass a nominal current, even in the unlikely event that the volume of the gas interrupter is brought to atmospheric pressure due to a very large gas leak. Thus the contacts of the vacuum interrupter are not repelled (and separated) and arcs do not strike between the contacts so long as said minimum contact pressure force value exceeds the minimum value required for a specified nominal current.

Thus, adding a mechanical spring system for reinforcing the contact pressure in a control device of the invention can constitute safety that is advantageous in terms of the reliability and operating continuity of the switchgear assembly equipped with the control device. Configurations other than the configurations of the device of FIG. 8 for such additional mechanical spring systems can be imagined, and the mechanical energy of the spring(s) can be used to contribute to the work of fully separating the contacts of the vacuum interrupter, as explained below.

An additional mechanical spring system is shown diagrammatically in FIG. 9, making it possible to improve the actuating mechanism for actuating the moving contact of the vacuum switchgear as shown in FIG. 3. This additional system has resilient compression mechanical means which comprise two springs 36 and 37, each of which acts on a pivotally-mounted arm, one end of which is provided with a wheel organized to press against a shaped-profile rolling surface on the cradle 4A3 of the auxiliary shaft 4 in the vicinity of the end 4B of the shaft 4 which can slide in translation in a guide element 13' fixed to the casing.

This additional spring system is shown in enlarged manner in FIG. 9*a*. Each of the two pivotally-mounted arms 38 and 39 carry a respective wheel 40, 41. The two shaped-profile rolling surfaces on the cradle 4A3 are symmetrical in this example, and the springs 36 and 37 and the pivotally-mounted arms are disposed symmetrically. When the switchgear assembly is in the closed position, the resultant force $F_r$ exerted by the spring system is directed along the axis Y of the auxiliary shaft 4, due to the fact that the system is disposed symmetrically about said axis. The profile of each of the rolling surfaces on the cradle 4A3 is organized so that the resultant force $F_r$ is directed in the same direction as the differential pressure force $F_p$, thus participating in the contact pressure force $F_c$ which is equal to the sum $F_p+F_r$. The profile is also organized so that the force $F_r$ changes direction along the axis Y when the auxiliary shaft 4 moves as a result of the main shaft 2 being driven to open or to close the switchgear assembly.

The change of direction of the force $F_r$ can be seen in FIG. 9*b* which shows the actuating mechanism when the switchgear assembly is in the open position at the end of the circuit-breaker function. Each rolling surface has a profile with a side projection, such that the y-axis component of the force exerted by the spring 36 or 37 on the auxiliary shaft 4 is reduced to zero and changes direction when the point of contact between a wheel 40 or 41 and the rolling surface passes over the crest of the side projection. The crest of such a projection is defined as the zone of the projection that is furthest away from the axis Y. Thus, when the wheel 31 carried by the auxiliary shaft 4 travels over the main portion 30A of the cam 30 while causing the shaft to move, when the switchgear assembly is opening or closing, the force $F_r$ decreases in absolute terms to zero and changes direction.

While the switchgear assembly is opening, the force $F_r$ changes direction to work against the differential pressure force $F_p$. It can be noted that such a change of direction makes it possible to reduce to some extent the work to be exerted by the control mechanism of the main shaft 2 to achieve full opening. It is understood that the energies of the springs and the profiles of the side projections are organized' so that the force $F_r$ remains lower than $F_p$ in absolute terms, so that the auxiliary shaft 4 is always subjected to a resultant force equal to the sum of the mechanical and pneumatic forces that are directed towards the vacuum interrupter to enable the contacts of the interrupter to be closed (or re-closed).

FIG. 9*c* diagrammatically shows another improved actuating mechanism for actuating the moving contact of the vacuum switchgear. The result is analogous to the result procured by the actuating mechanism of FIG. 9, and makes it possible, to a lesser extent, to increase the contact pressure in said switchgear without increasing the drive energy necessary for the control device. Each of the two identical springs 36 and 37 disposed symmetrically about the axis Y has a first end pivotally hinged to a fixed support, and a second end pivotally hinged to the auxiliary shaft. The change of direction of the force $F_r$ takes place when the two springs are simultaneously aligned along the same axis perpendicular to the axis Y of the auxiliary shaft, which takes place in practice once the shaft has traveled over most of the stroke e for the desired spacing between the contacts of the vacuum interrupter.

FIG. 9*d* diagrammatically shows another improved actuating mechanism for actuating the moving contact of the vacuum switchgear, which mechanism advantageously combines the two preceding solutions. The cradle 4A3 of the auxiliary shaft 4 has a single shaped-profile rolling surface against which a wheel mounted at one end of a pivotally-mounted arm presses. Similarly to the solution described with reference to FIGS. 9, 9*a*, and 9*b*, one end of a spring 37 acts on said pivotally-mounted arm, and the profile of the rolling surface has a side projection organized such that the y-axis component of the force exerted by the spring 37 on the auxiliary shaft 4 can decrease to zero so as to change direction. The cradle 4A3 also has a pivotally-mounted hinge attached to one end of another spring 36 as in the solution described with reference to FIG. 9*c*. The spring 36 has less energy than the energy of the spring 37, and the resulting force $F_r$ exerted by the two springs on the shaft 4 has a component $F_rX$ which is oriented towards the gas interrupter along the axis X along which the main shaft 2 moves in translation.

This orientation of the component $F_rX$ makes it possible to reduce the instantaneous forces at the surface of contact 13'A between the end 4B of the shaft 4 and the guide element 13' fixed to the casing 7. These instantaneous forces are relatively large when the cam 30 comes into contact with the wheel 31 while the switchgear assembly is being driven open, due to the instantaneous speed of several meters per second for the movement in translation of the main shaft 2, in particular if the opening slope of the main portion 30A of the cam 30 is relatively steep. It can be noted that the presence of the pivotally-mounted spring 36 is not essential, and mainly serves to reinforce, if necessary, the component $F_rY$ of the resultant force $F_r$ along the axis Y while reducing the component $F_rX$.

FIG. 10 diagrammatically shows an alternative embodiment of the sealing means for sealing relative to the gaseous insulating fluid $G_2$ of the gas interrupter, the pressure $P_2$ of which fluid is used to operate a control device of the invention. No sealing means for sealing relative to the gas are provided in the gap 49 between the piston 4A' and the bore part 8' which carries the sliding contacts 9. The piston essentially serves as a mechanical guide for guiding the auxiliary shaft 4 and as an electricity conductor for conducting electricity between the moving contact of the vacuum interrupter and a conductive plate 20 electrically connected to a pole of the gas interrupter, it being possible for said plate 20 to constitute one face of a metal casing such as the casing referenced 7 in the preceding embodiments. The vacuum interrupter is surrounded with a gas $G_1$ which is distributed on either side of the piston 4A' with substantially the same pressure $P_1$. The piston 4A' can be provided with a passageway formed by a small channel 25, but such a channel is not normally necessary because balancing, even relatively slow balancing, of the pressure of the gas $G_1$ between the two sides of the piston takes place via the gap 49 that is not gastight. Preferably, a device 45 for measuring the pressure $P_1$ is provided, in particular for checking that said pressure remains higher than the low limit $P_{1min}$.

The wall 7' that separates the two gaseous insulating fluids $G_1$ and $G_2$ is bonded in gastight manner to the conductive plate 20, and has a flexible zone in the center of which an opening is provided through which the auxiliary shaft 4 passes in leaktight manner. The wall 7' is in the form of a sealing bellows, and can be made of a metal chosen to offer flexibility and strength that are sufficient. It is preferably in the form of a disk with an opening in its center for passing the shaft 4. Its diameter can be significantly larger than the diameter of the piston 4A', it being possible for the diameter of the piston to be reduced so long as the section of electrical conduction via the sliding contacts 9 remains suitable for passing the current that is to passed by the switchgear assembly. By increasing the diameter of the wall 7', it is possible to obtain a differential pressure force $F_p$ that is higher than the differential pressure force that would be obtained by a control device having a gastight piston as shown, for example, in FIG. 3, this comparison being applicable for moving masses that are substantially equal between the two control devices. In addition, since, in a solution of the sealing bellows type, there is no surface moving relative to a sealing gasket, it is possible to obtain very good leaktightness at the leaktight connection between the bellows and a moving assembly as constituted in this example by the auxiliary shaft 4.

Leakage of the gas $G_2$ at the pressure $P_2$ towards the volume $V_1$ of the gas $G_1$ at the pressure $P_1$ is normally negligible, and the quantity of gas $G_2$ flowing into the volume $V_1$ is normally always smaller than the quantity of gas $G_1$ that can leak from said volume to the outside of the insulating sheath 11. In principle, there is therefore no risk of the pressure $P_1$ increasing to above the maximum value $P_{1max}$ that is critical for the mechanical structure of the vacuum interrupter, and, a priori, it is not necessary to provide a safety device such as a valve for discharging gas $G_1$ at an excessive pressure. However, for absolute safety, it is possible to provide between the volume $V_1$ and the outside atmosphere an inexpensive gas discharge device constituted by a breakable or "rupturable" disk 46 that is organized to break when the difference in gas pressure between the two sides of the disk exceeds a determined break value. In this example, the breakable disk 46 is mounted on a metal annular part 44 that electrically connects the bore part 8' to the conductive plate 20, and that also participates in the sealing between the volume $V_1$ and the outside atmosphere.

A variant embodiment of the preceding control device of FIG. 10 is shown diagrammatically in FIG. 11. This variant includes a safety space at atmospheric pressure which operates on the safety principle used in the control device of FIG. 7. In the event that the wall 7', which in particular acts as a sealing bellows for sealing relative to the gas $G_2$ of the gas interrupter, is not fully leaktight, any leakage of gas $G_2$ through said bellows is discharged to the outside atmosphere via a channel 24. The volume $V_1$ which lies within the wall 7' and the piston 4A of the auxiliary shaft communicates with the outside atmosphere via the channel 24, and the gas $G_1$ contained in said volume $V_1$ is thus atmospheric air in this example.

As in the switchgear assembly of FIG. 7, a dielectric material 28 is overmolded around the leaktight chamber of the vacuum interrupter. The gas $G_0$ of the volume $V_0$ lying between the material 28 and the piston 4A is analogous to the gas $G_1$ used for the device of FIG. 7, and what is said above concerning that gas remains applicable for the present configuration. In this example, the piston 4A does not serve to generate the contact pressure force necessary in the vacuum interrupter. On the contrary, since the gas $G_0$ is at a pressure that is preferably higher than atmospheric pressure, the differential pressure between the two sides of the pistons generates a force that tends to work against (while remaining considerably lower than) the differential pressure force generated by the gas $G_2$ on the flexible piston 7'. Preferably, the diameter of the piston 4A is also chosen to be as small as possible, provided that the section of electrical conduction via the sliding contacts 9 remains sufficient. It can be noted that the sealing means 26 and the sealing annular element 27 are not necessarily essential and that the gas $G_0$ can then be atmospheric air, as explained above with reference to the device of FIG. 7.

The control devices that are described above are shown in applications to switchgear assemblies each of which comprises a vacuum interrupter associated with a gas interrupter. However, it is understood that a control device of the invention can be applied a switchgear assembly in which a first and/or a second item of switchgear is made up of a plurality of interrupters arranged electrically in series or in parallel. For example, it is known that a switchgear assembly can comprise a vacuum item of switchgear made up of a plurality of vacuum interrupters connected together in parallel with their moving contacts constrained to move together by being connected to a common auxiliary shaft that is suitable for being moved in translation.

The invention claimed is:

1. A control device for actuating at least two items of switchgear in co-ordinated manner, which items are electrically connected together in series to constitute a switchgear assembly in which a vacuum first item of switchgear (1) that performs interruption in a vacuum includes a pair of contacts (5, 6) that can be separated to switch from a closed position to an open position, the control device including a main drive shaft (2) for actuating a second item of switchgear (10) immersed in a gaseous insulating fluid ($G_2$) contained in a certain volume ($V_2$) at a determined pressure ($P_2$), the control device further including an auxiliary shaft (4) suitable for being moved by coupling means (3) to enable a moving contact (5) of the first item of switchgear (1) to be driven when said main shaft (2) is moved, said moving contact (5) being held pressed against the other contact (6) of said first item of switchgear (1), when said first item of switchgear is in the closed position, by a force ($F_c$) chosen to generate a contact pressure higher than a determined value, said control device being characterized in that said auxiliary shaft (4) passes in leaktight manner through a wall (7A, 7') which separates said volume ($V_2$) of gaseous insulating fluid ($G_2$) from another volume ($V_1$) of fluid ($G_1$) at a lower pressure ($P_1$), the difference between the respective pressures ($P_2$, $P_1$) of the two fluids ($G_1$, $G_1$) procuring a certain force ($F_p$) which is applied to said auxiliary shaft (4) and which participates in said contact pressure force ($F_c$).

2. A control device according to claim 1, in which a portion of said auxiliary shaft (4) is constituted by a piston (4A) suitable for being moved inside a bore (8) formed by a part which is mounted in leaktight manner in an opening in said wall (7A), sealing means (17) for sealing relative to said gaseous insulating fluid ($G_2$) being arranged between said piston (4A) and said bore (8).

3. A control device according to claim 2, in which said wall (7A) and said bore (8) constitute an electrically conductive assembly connected to a pole of the second item of switchgear (10), said piston (4A) includes at least one electrically conductive portion (4A2) connected to the moving contact (5) of the first item of switchgear (1), and sliding contacts (9) are disposed between said bore (8) and said conductive portion (4A2) of the piston.

4. A control device according to claim 1, in which said wall (7A) is constituted by one face of a casing (7) which encloses at least a portion of said volume ($V_2$) of gaseous insulating fluid ($G_2$) and in which said coupling means (3) are disposed.

5. A control device according to claim 4, in which the auxiliary shaft (4) has an end portion (4B) suitable for sliding in translation in a guide element (13, 13') that is fixed to a face (7B) of the casing (7) that is opposite the face constituting said wall (7A).

6. A control device according to claim 1, in which the main shaft (2) has a segment (2A) that has one side provided with a surface arranged to form a cam (30) for guiding a rolling element (31) which is constrained to move with the auxiliary shaft (4).

7. A control device according to claim 1, in which said coupling means (3) comprise resilient compression mechanical means suitable for exerting a force on said auxiliary shaft (4) for participating in said contact pressure force ($F_c$) in addition to the force ($F_p$) procured by the difference in the respective pressures ($P_2$, $P_1$) of the two fluids ($G_2$, $G_1$).

8. A control device according to claim 7, in which said resilient compression means comprise a spring (35) which is mounted on the auxiliary shaft (4) and which has one end pressing against a pusher element (34) suitable for being compressed under the action of a finger (33), said finger being fixed to said main shaft (2) and arranged to press against said pusher element (34) when the second item of switchgear (10) is in the closed position.

9. A control device according to claim 7, in which said resilient compression means comprise at least one spring (36, 37), the resultant force ($F_r$) exerted by said compression means on said auxiliary shaft (4) being organized to change direction along the axis (Y) along which said shaft moves in translation while said shaft is moving to open the first item of switchgear (1), while remaining lower than the force ($F_p$) procured by the difference in the respective pressures ($P_2$, $P_1$) of the two fluids ($G_2$, $G_1$).

10. A control device according to claim 9, in which said spring (36, 37) acts on a pivotally mounted arm (38, 39) having one end provided with a wheel (40, 41) arranged to press against a shaped-profile rolling surface on said auxiliary shaft (4).

11. A control device according to claim 9, in which said resultant force ($F_r$) has a component ($F_rX$) which is oriented continuously towards the second item of switchgear (10) along the axis (X) along which the main drive shaft (2) moves in translation.

12. A control device according to claim 2, in which said bore (8) has a radial orifice (24) that puts the outside atmosphere into communication with a gap between the piston (4A) and the bore (8), said radial orifice (24) opening out into said gap between said sealing means (17) and the first item of switchgear (1), so that any leakage of gas ($G_2$) through the sealing means (17) is discharged to the outside atmosphere.

13. A control device according to claim 1, in which said wall (7') is bonded to a conductive plate (20) electrically connected to a pole of the second item of switchgear (10) and has a flexible zone in the center of which an opening is provided through which said auxiliary shaft (4) passes in leaktight manner.

14. A control device according to claim 13, in which said auxiliary shaft (4) is provided with a piston (4A, 4A') suitable for being moved inside a bore (8, 8') electrically connected to said conductive plate (20), and in which sliding contacts (9) are arranged between said piston and said bore.

15. A control device according to claim 14, in which sealing means (26) are arranged between said piston (4A) and said bore (8), and in which said other volume ($V_1$) is provided between said piston (4A) and said wall (7'), the volume ($V_1$) being in communication with the outside atmosphere so as to be filled with air substantially at atmospheric pressure.

16. A control device according to claim 1, in which said fluid ($G_1$) of said other volume ($V_1$) is a gas, and in which a safety device constituted by a valve (23) or by a breakable disk (46) makes it possible to discharge the gas ($G_1$) towards the outside atmosphere in the event that the pressure ($P_1$) of said gas exceeds a critical value.

* * * * *